Dec. 14, 1965    R. A. ROWLEY ETAL    3,223,971
CHARACTER GROUP COMPARISON SYSTEM
Filed June 28, 1956    33 Sheets-Sheet 14
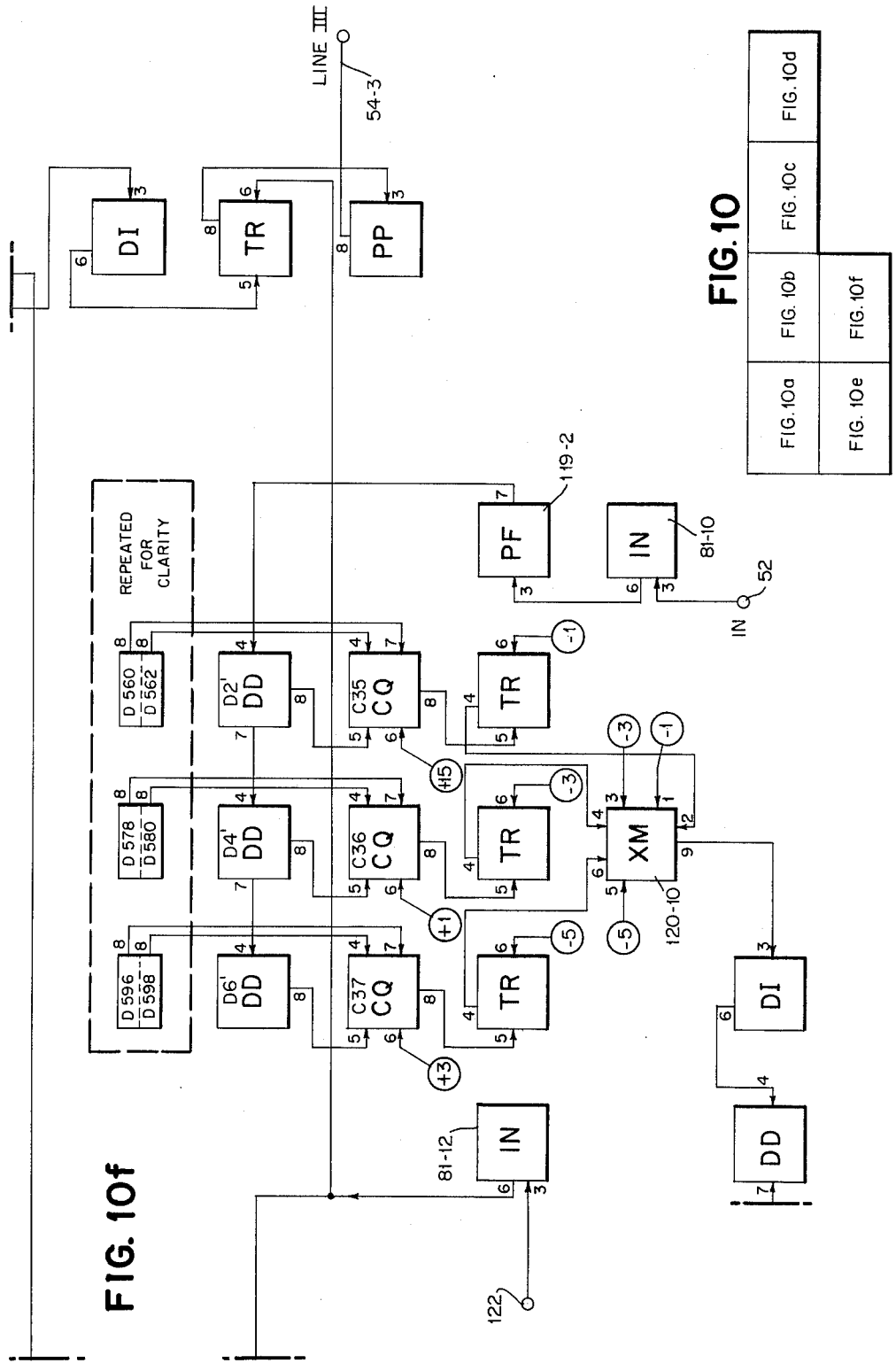

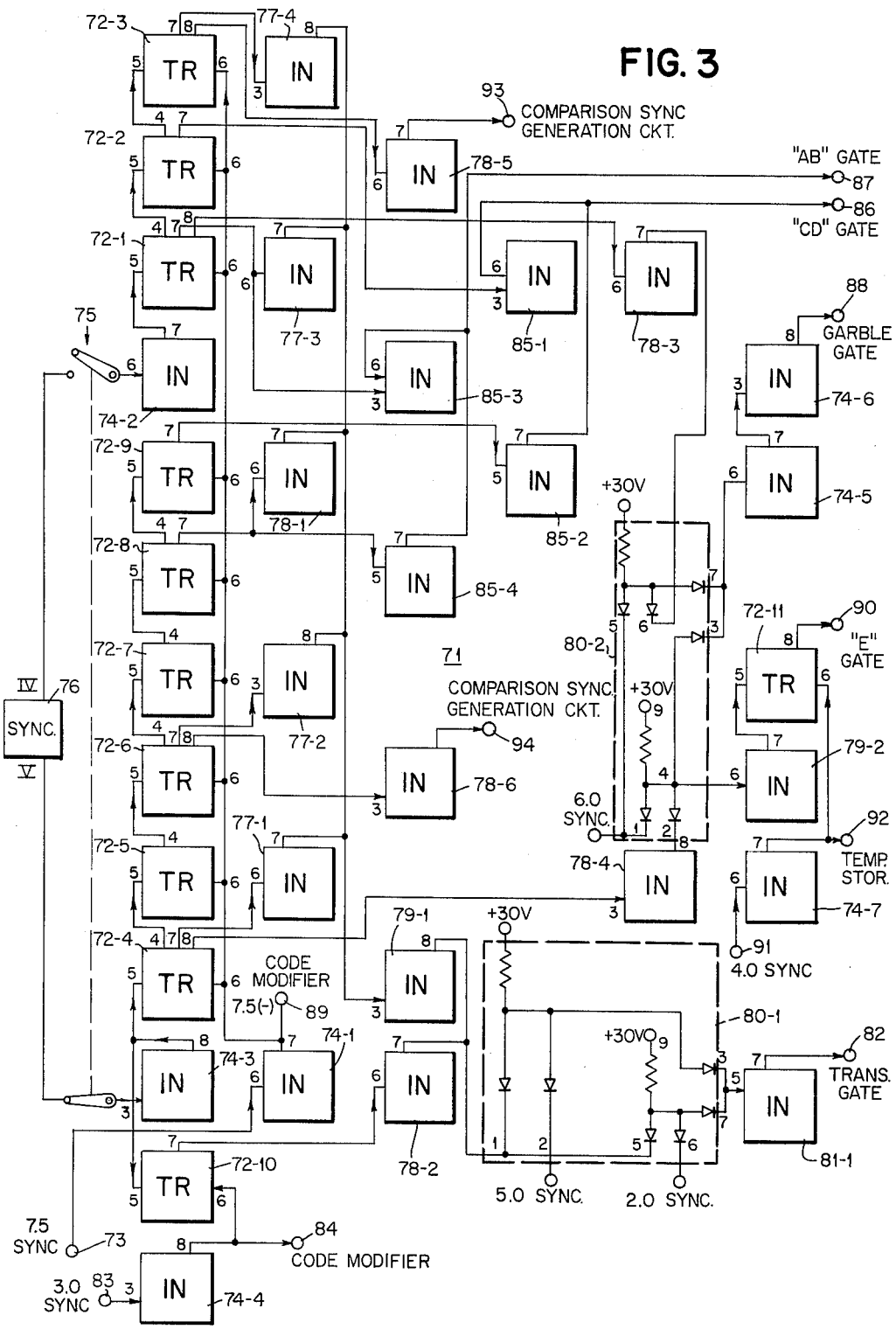

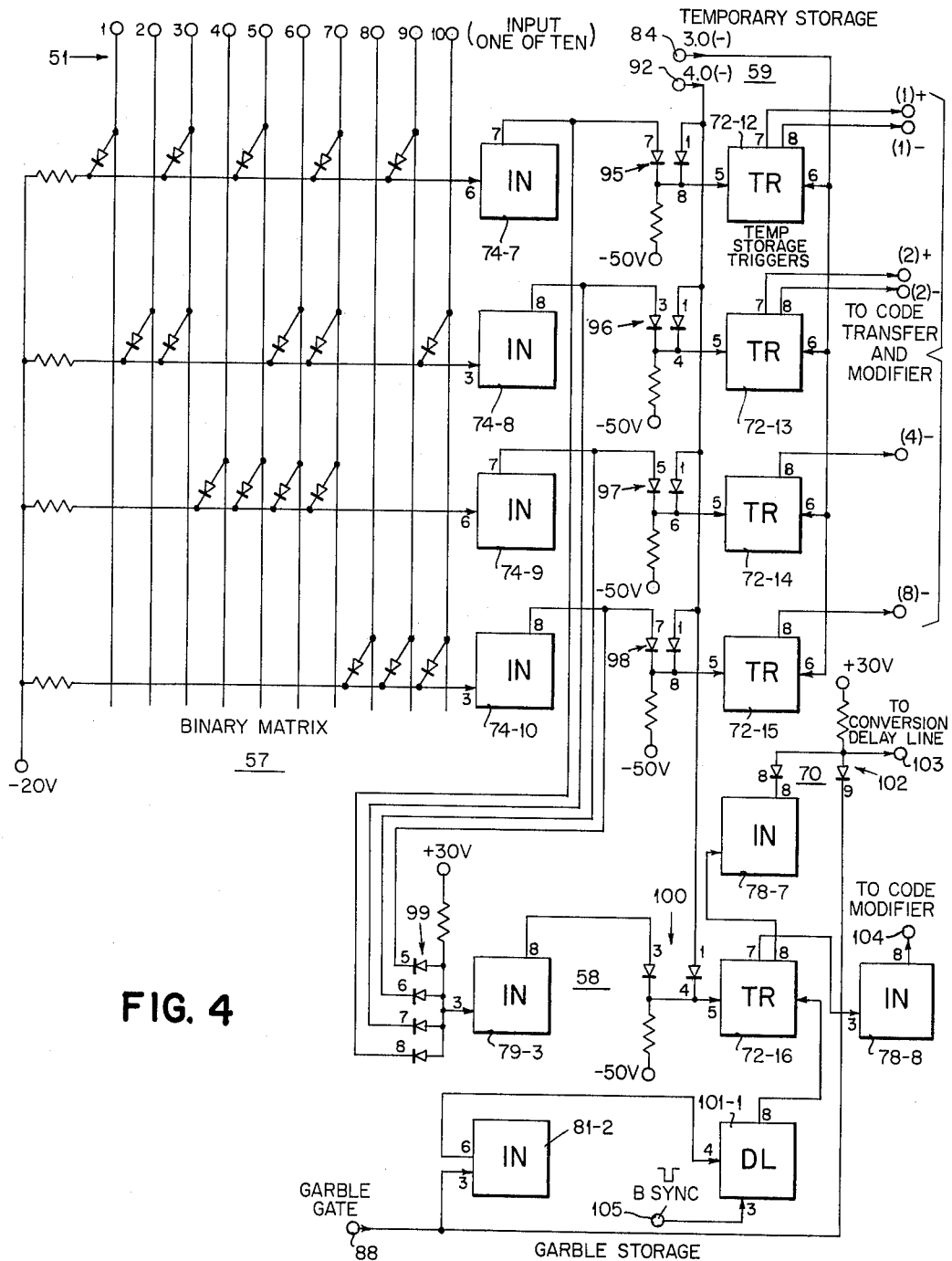

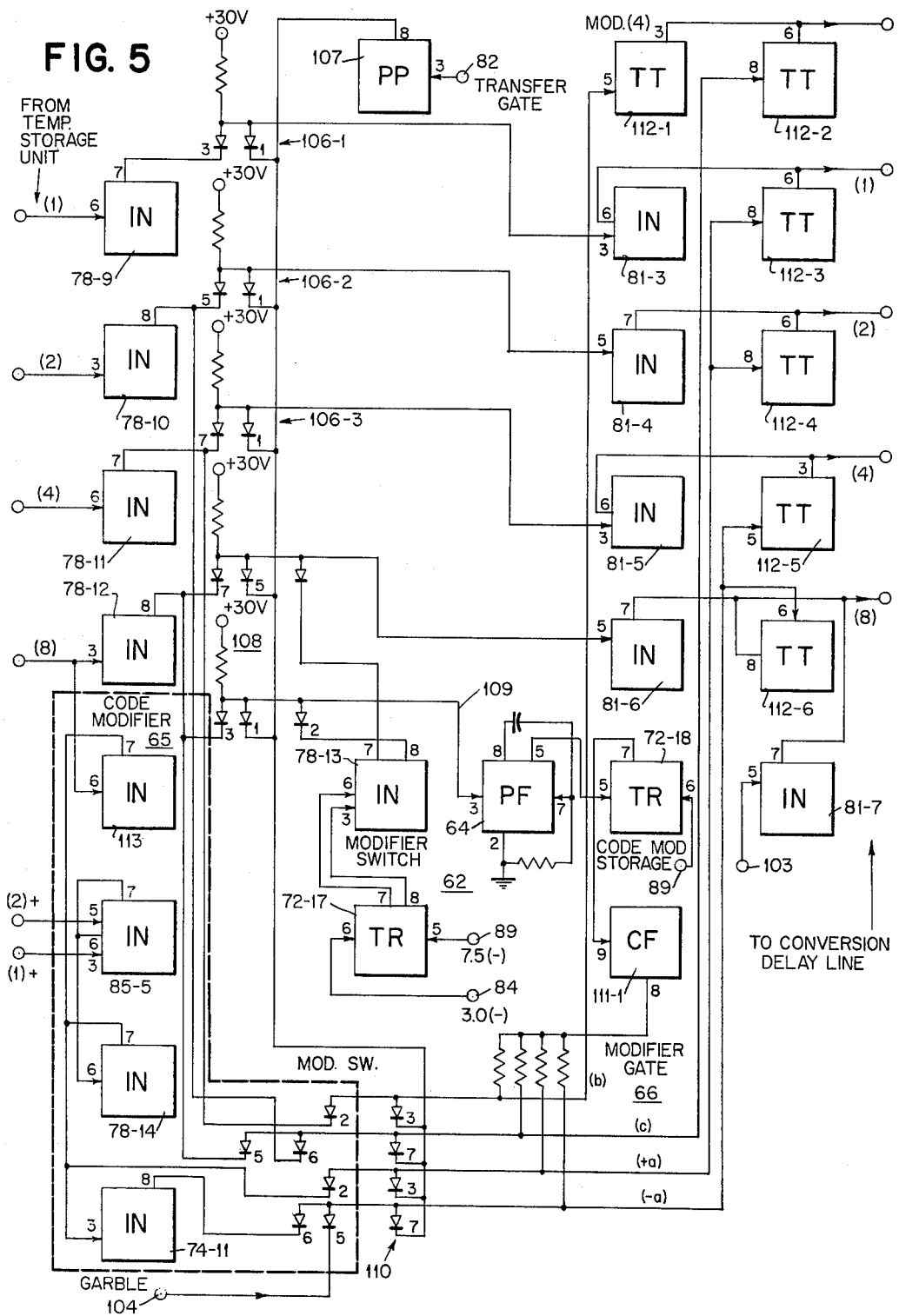

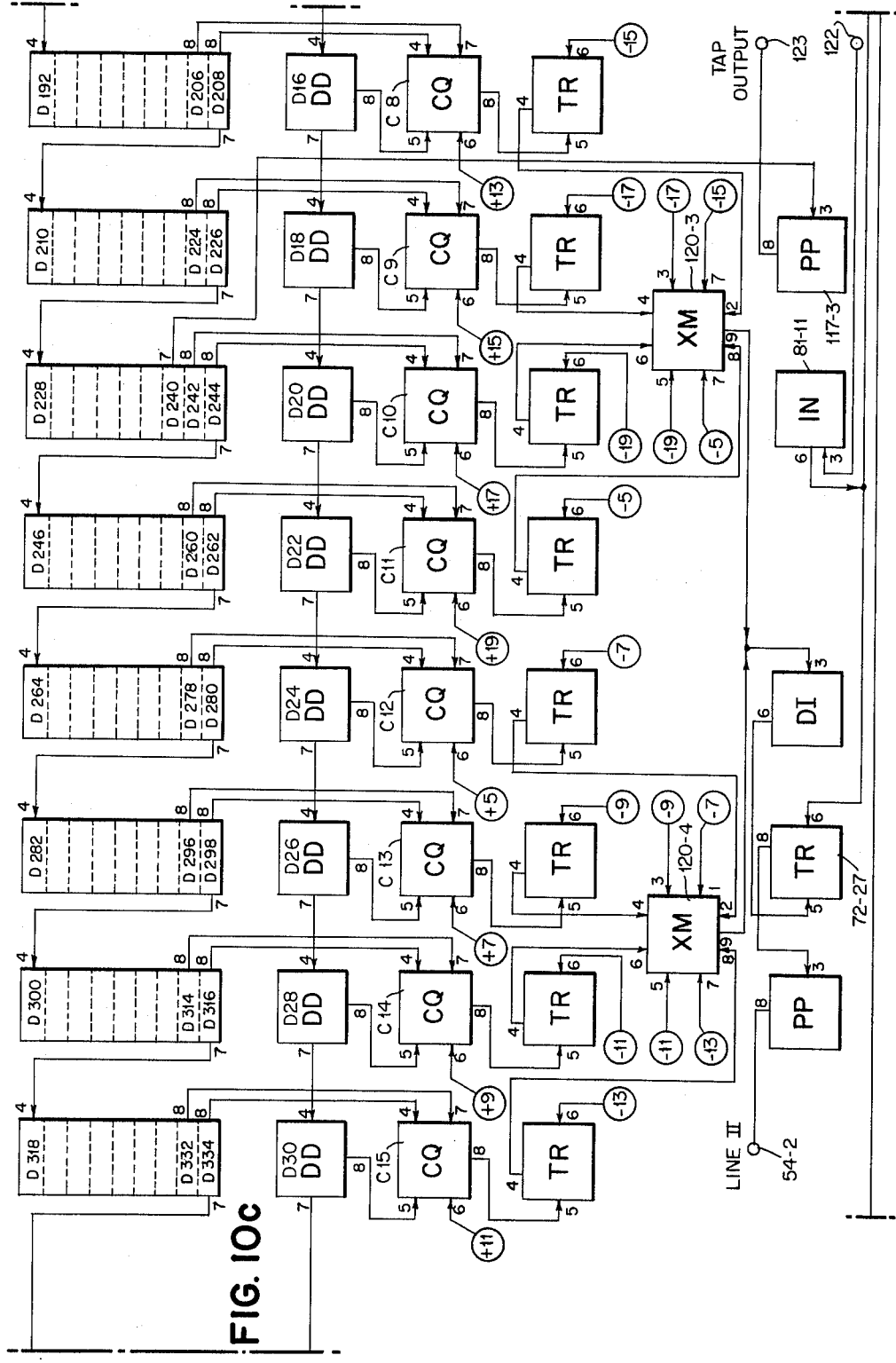

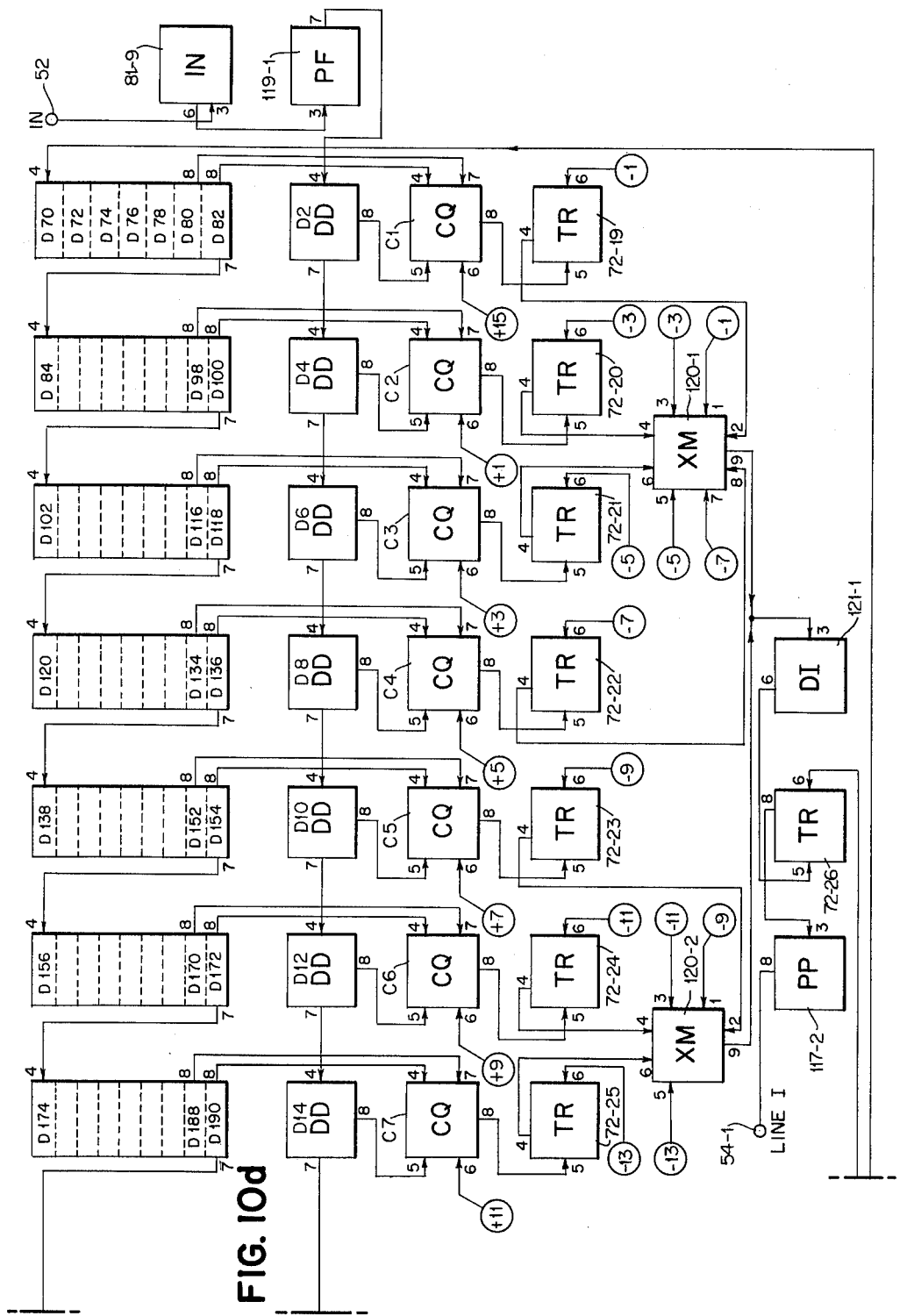

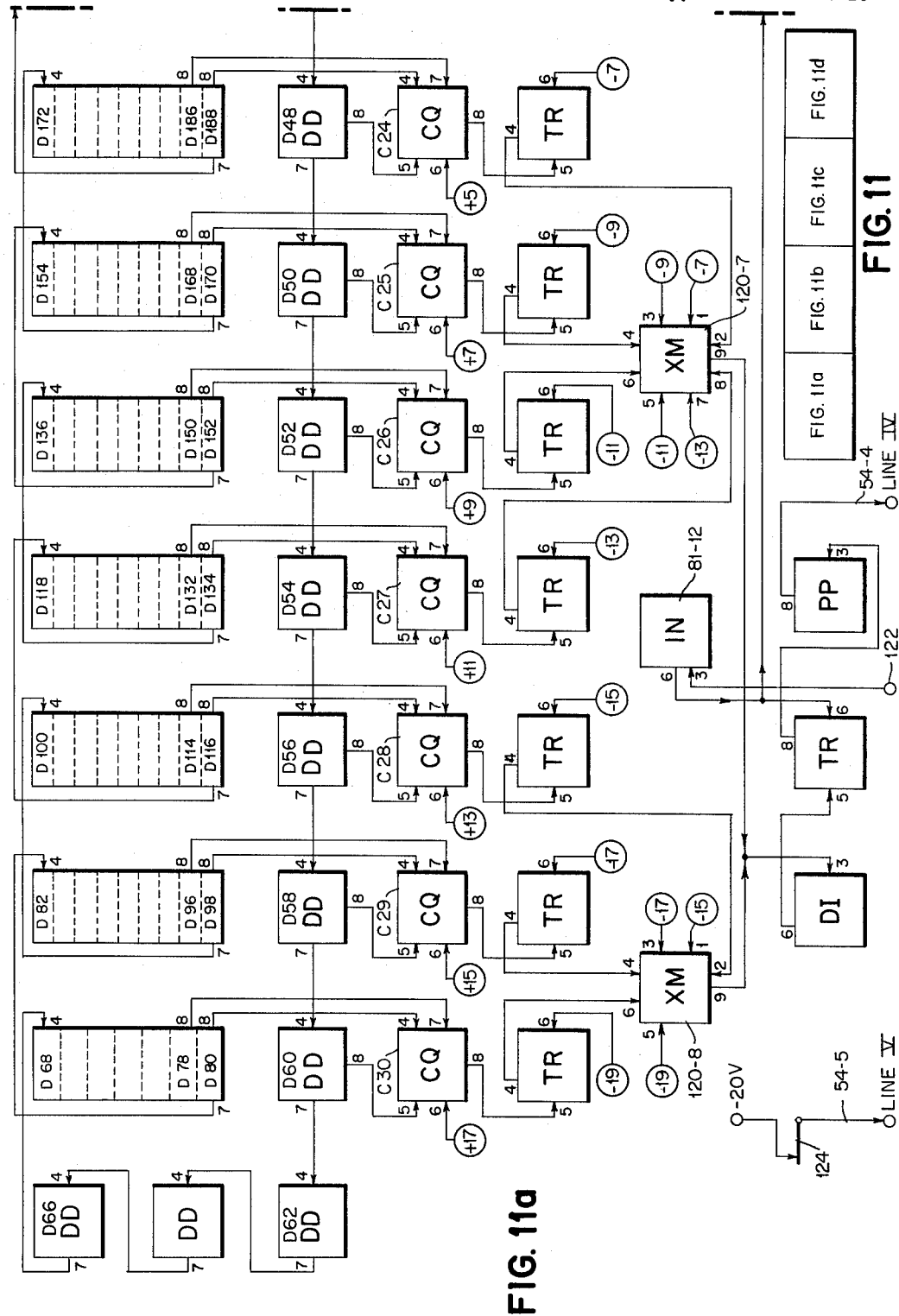

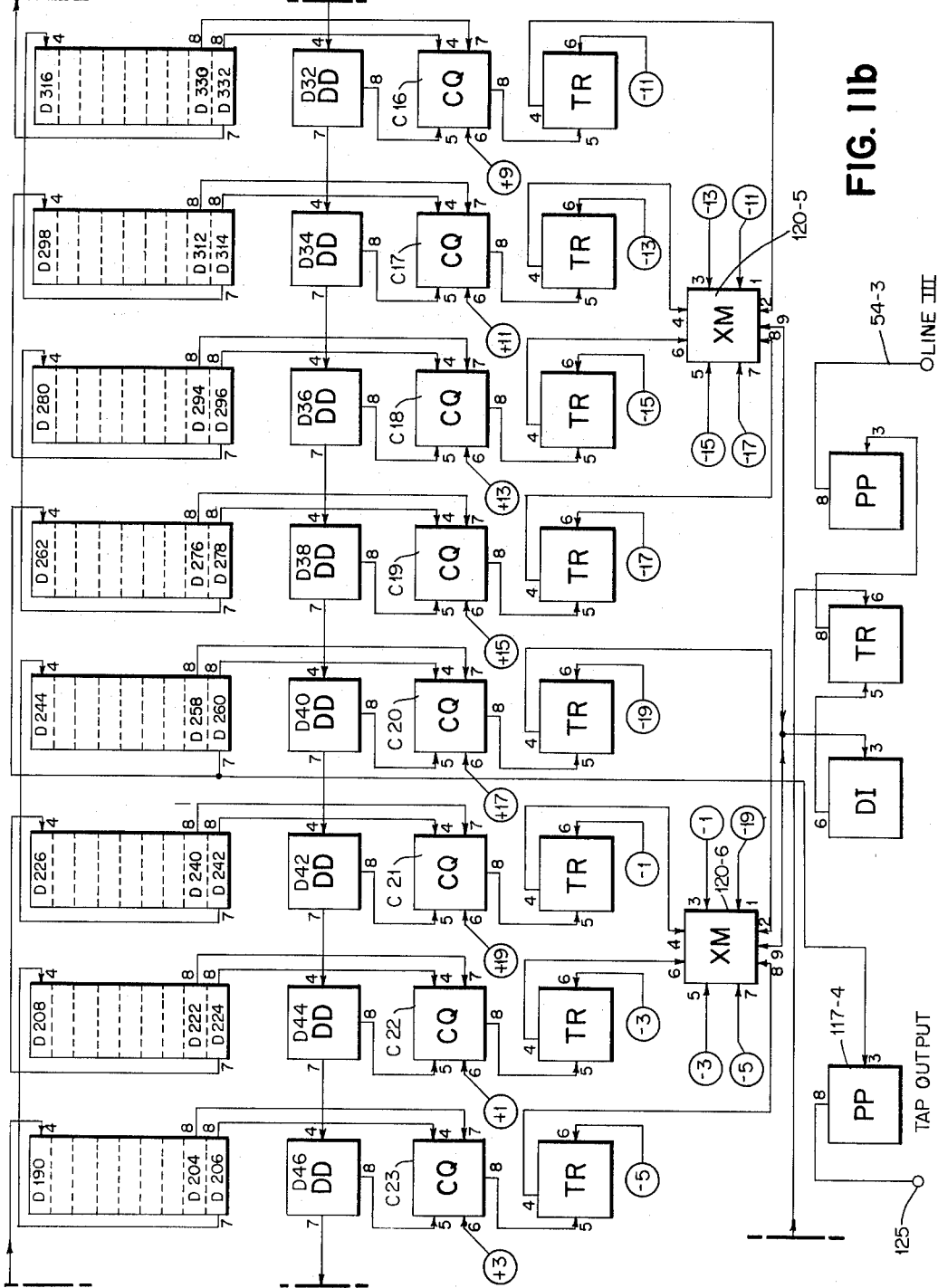

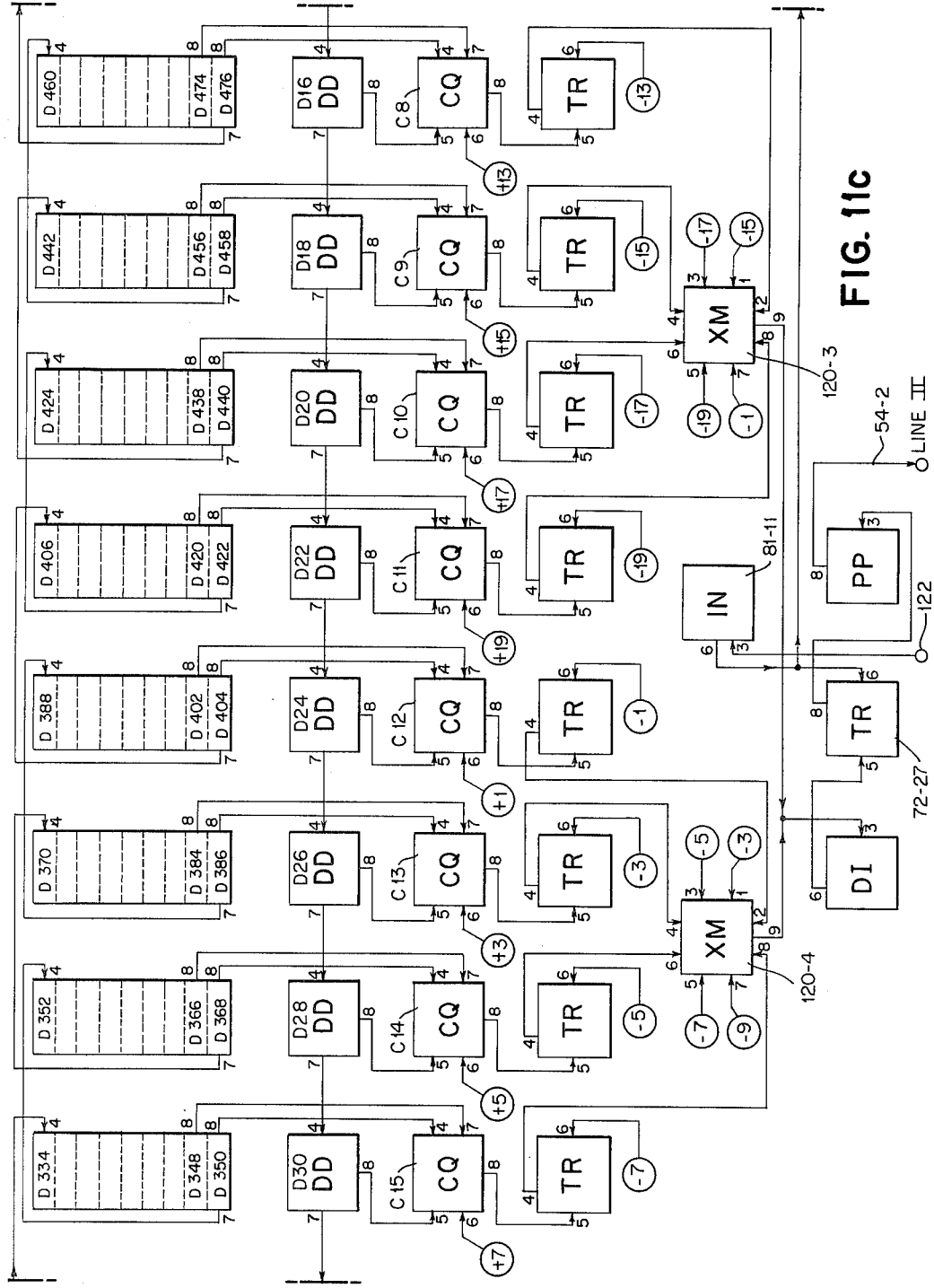

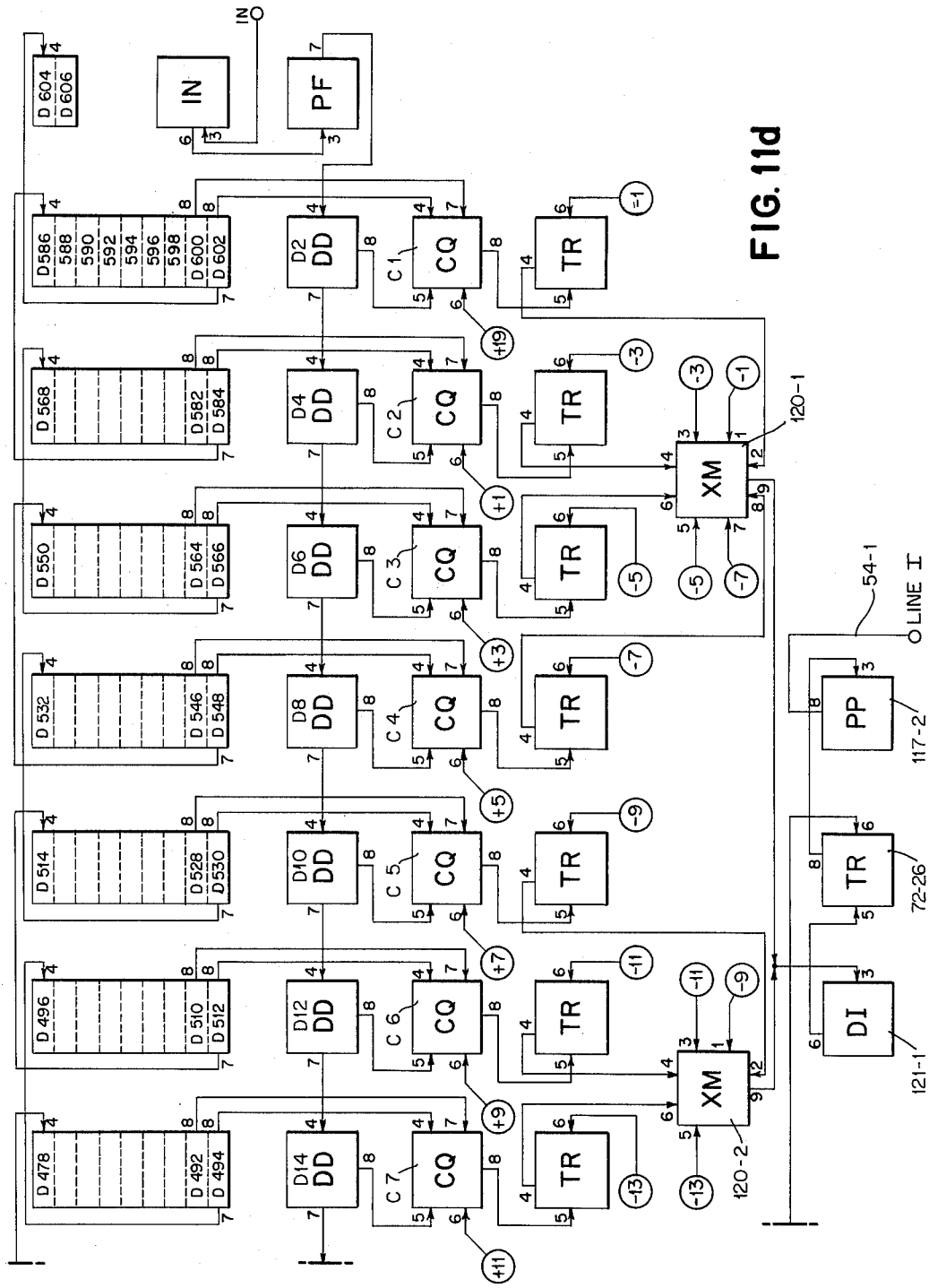

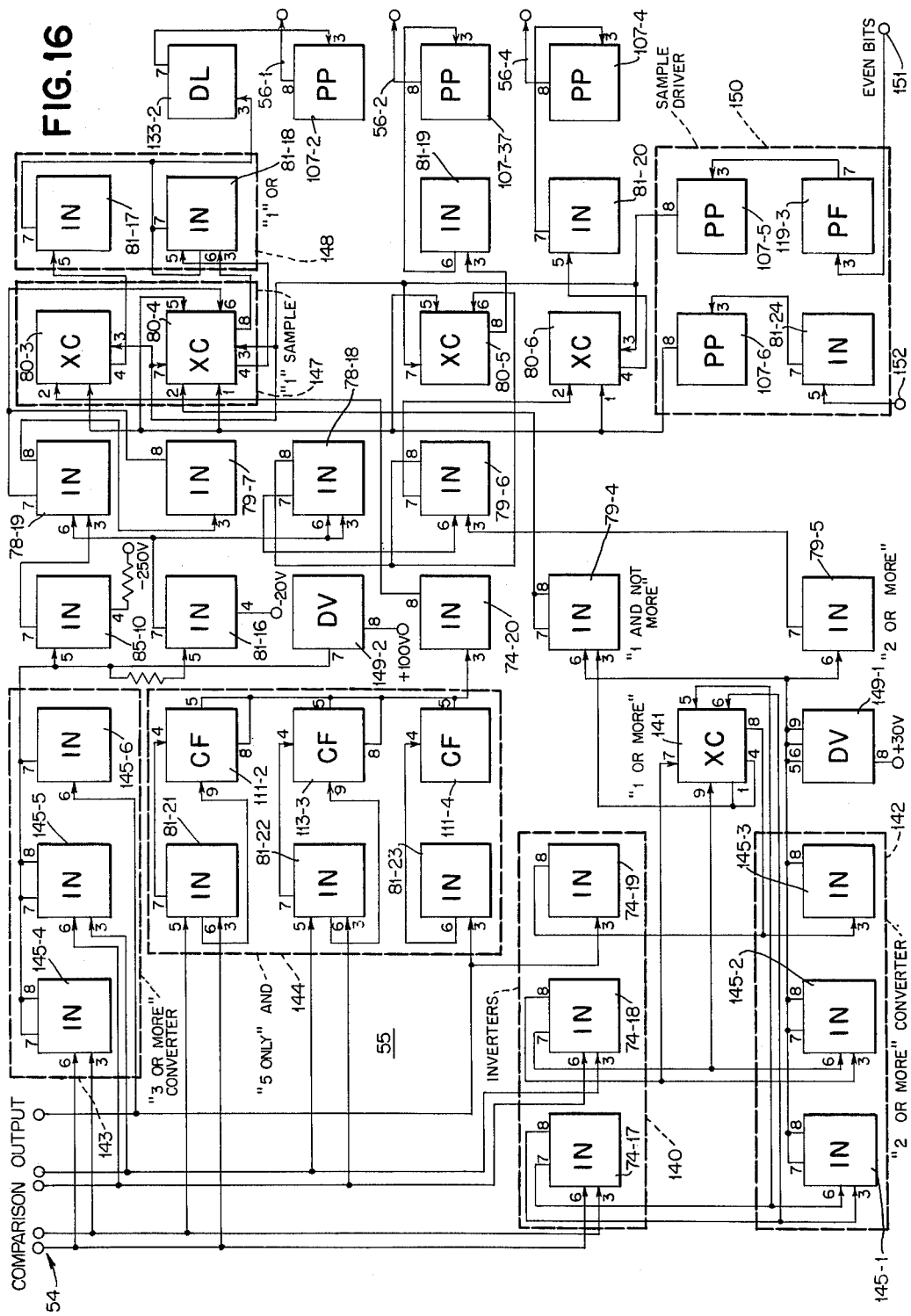

Dec. 14, 1965 R. A. ROWLEY ETAL 3,223,971

CHARACTER GROUP COMPARISON SYSTEM

Filed June 28, 1956 33 Sheets-Sheet 31

Dec. 14, 1965  R. A. ROWLEY ETAL  3,223,971
CHARACTER GROUP COMPARISON SYSTEM
Filed June 28, 1956  33 Sheets-Sheet 32
FIG. 33
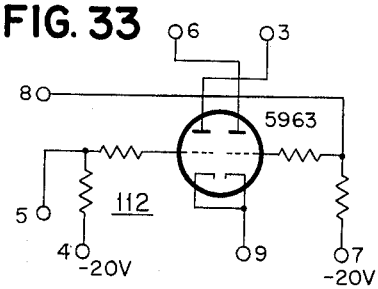
FIG. 34
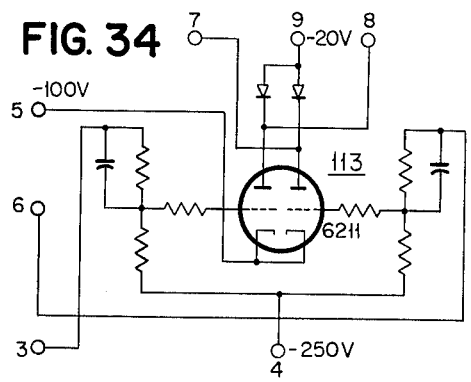
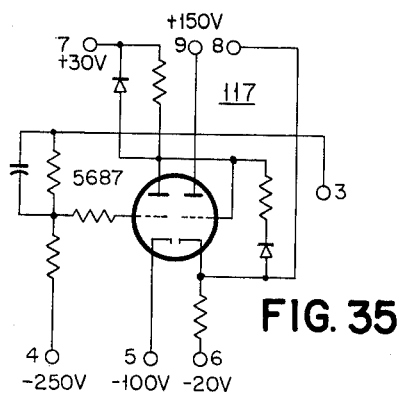
FIG. 35
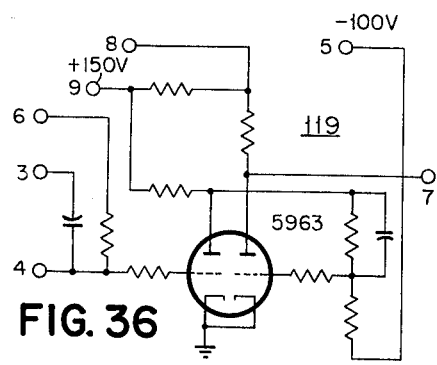
FIG. 36
FIG. 37
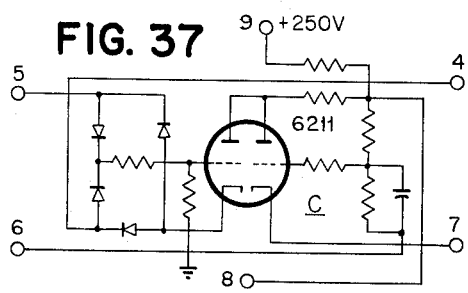
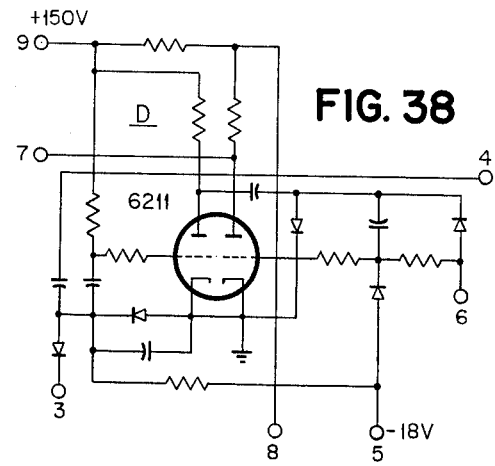
FIG. 38
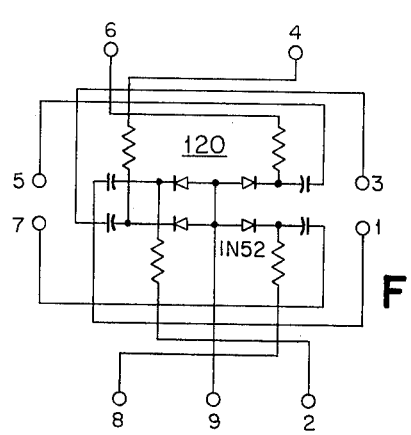
FIG. 39

United States Patent Office 3,223,971
Patented Dec. 14, 1965

3,223,971
CHARACTER GROUP COMPARISON SYSTEM
Russell A. Rowley, Binghamton, Francis Vallee Adams, Endicott, Genung L. Clapper, Vestal, and Arthur Hamburgen, Endicott, N.Y., assignors to International Business Machines Corporation, New York, N.Y., a corporation of New York
Filed June 28, 1956, Ser. No. 594,648
16 Claims. (Cl. 340—146.2)

This invention relates to systems for detecting equality or identity between groups of information items or characters, and more particularly to arrangements adapted to receive a large number of character groups and to compare every character group with every other character group, producing an output signal whenever identical groups occur.

A principal object of the present invention is to provide an improved system for comparing groups of characters to detect the occurrence of identical groups.

Another object is to provide an improved system for receiving a large number of character groups and for comparing every character group with every other character group, an output signal being produced when ever identical groups occur.

An additional object of the present invention is the provision of an improved system for comparing groups of characters to detect the occurrence of identical groups, in which means are provided for readily changing the number of characters in the groups to be compared.

A further object is to provide a system which substantially reduces the number of bits required to represent a character group.

Still another object of the present invention is to provide a system for representing in binary notation the number of a plurality of input lines which are simultaneously signalled.

Other objects and features of the present invention will be pointed out in the following description and claims and illustrated in the accompanying drawings, which disclose, by way of example, the principle of the invention and the best mode, which has been contemplated, of applying that principle.

In the drawings, in which like reference numerals designate like components:

FIG. 3 is a block diagram of the programming portion of the system of FIG. 2;

FIG. 4 is a block diagram of the decimal to binary matrix, temporary storage and garble storage portions of the system of FIG. 2;

FIG. 5 is a block diagram of the code transfer and code modifier portions of the system of FIG. 2;

FIG. 6 is a block diagram of the conversion delay line and output portions of the system of FIG. 2;

FIG. 11 (together with FIGS. 11a–11d) is a block diagram of the delay line and comparison system of FIG. 9 set for pentagraph operation, certain relay contacts being omitted for clarity;

FIG. 15b is a timing chart illustrating the operation of the synchronizing generator of FIG. 15a;

FIG. 16 is a block diagram of the five line to binary conversion system forming a portion of the basic system of FIG. 1;

Figure 17:
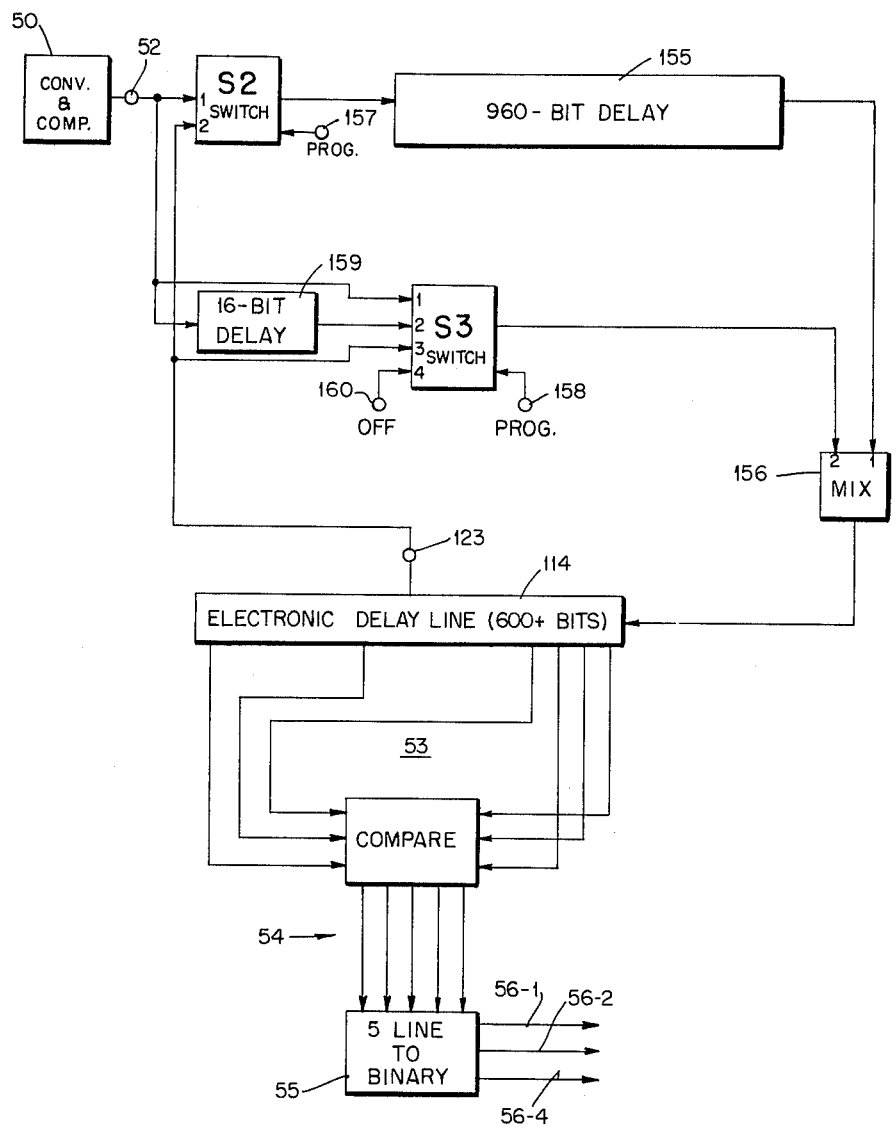
FIG. 17 is a basic flow diagram of the character group comparison system in accordance with the present invention arranged for tetragraph operation.
Figure 18B:
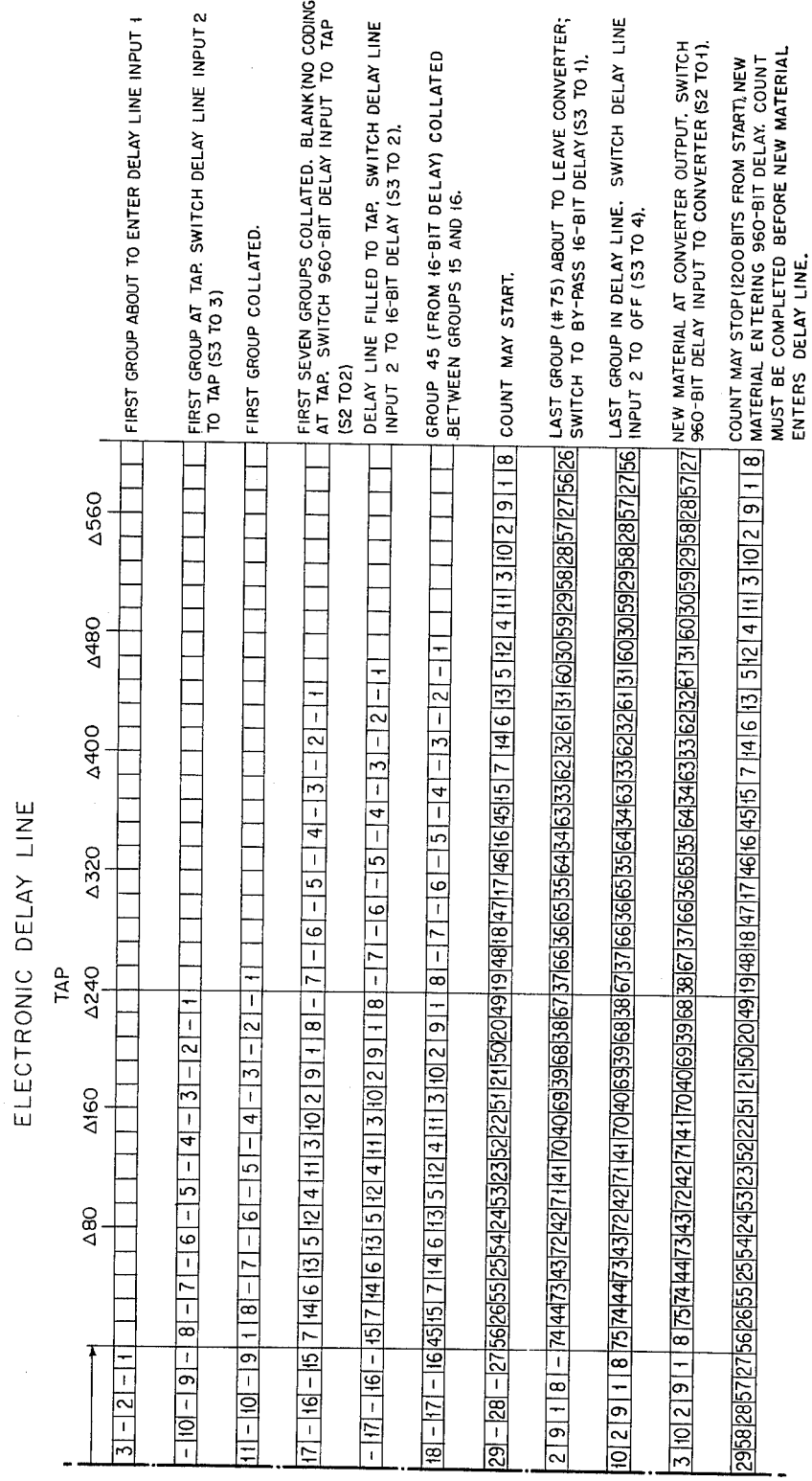
Figure 19:
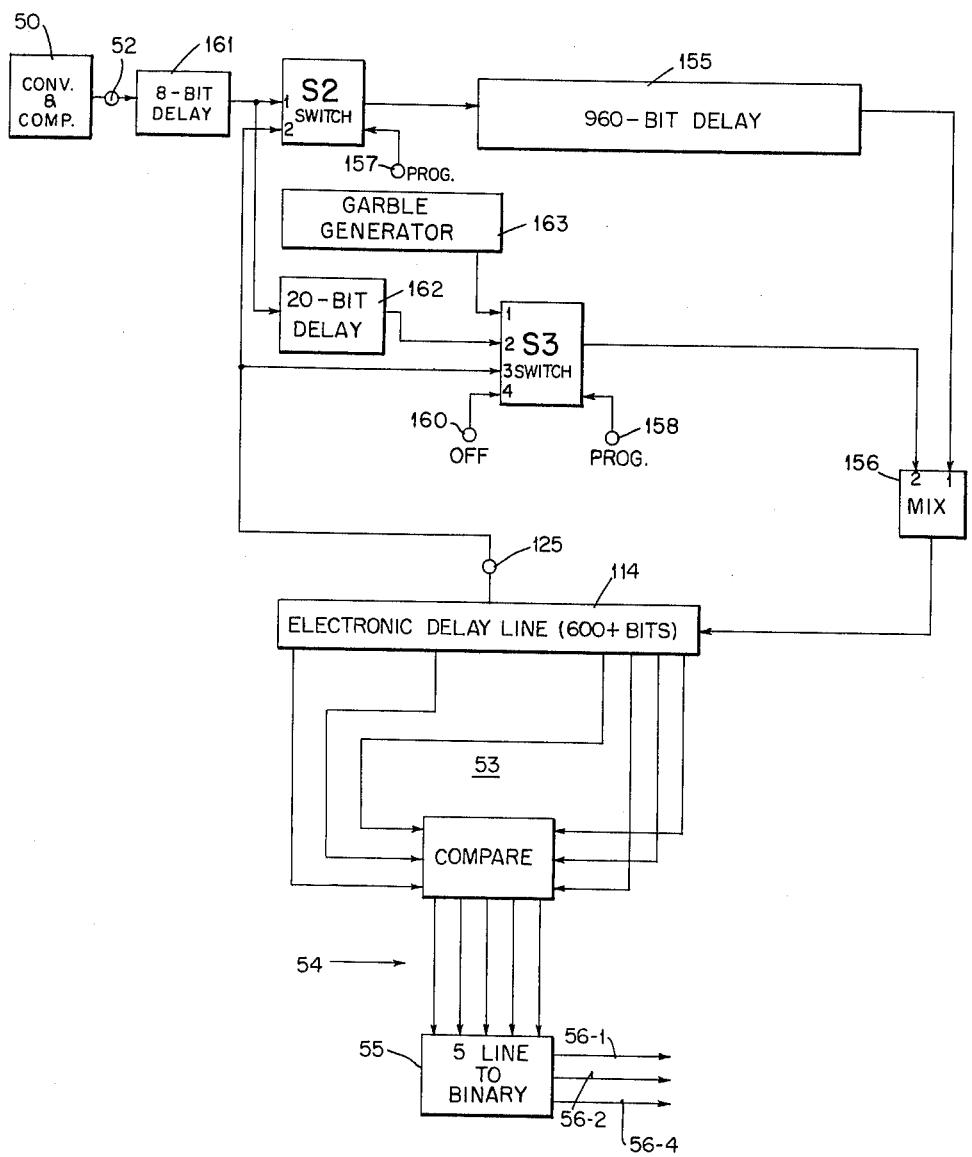
Figure 20A:
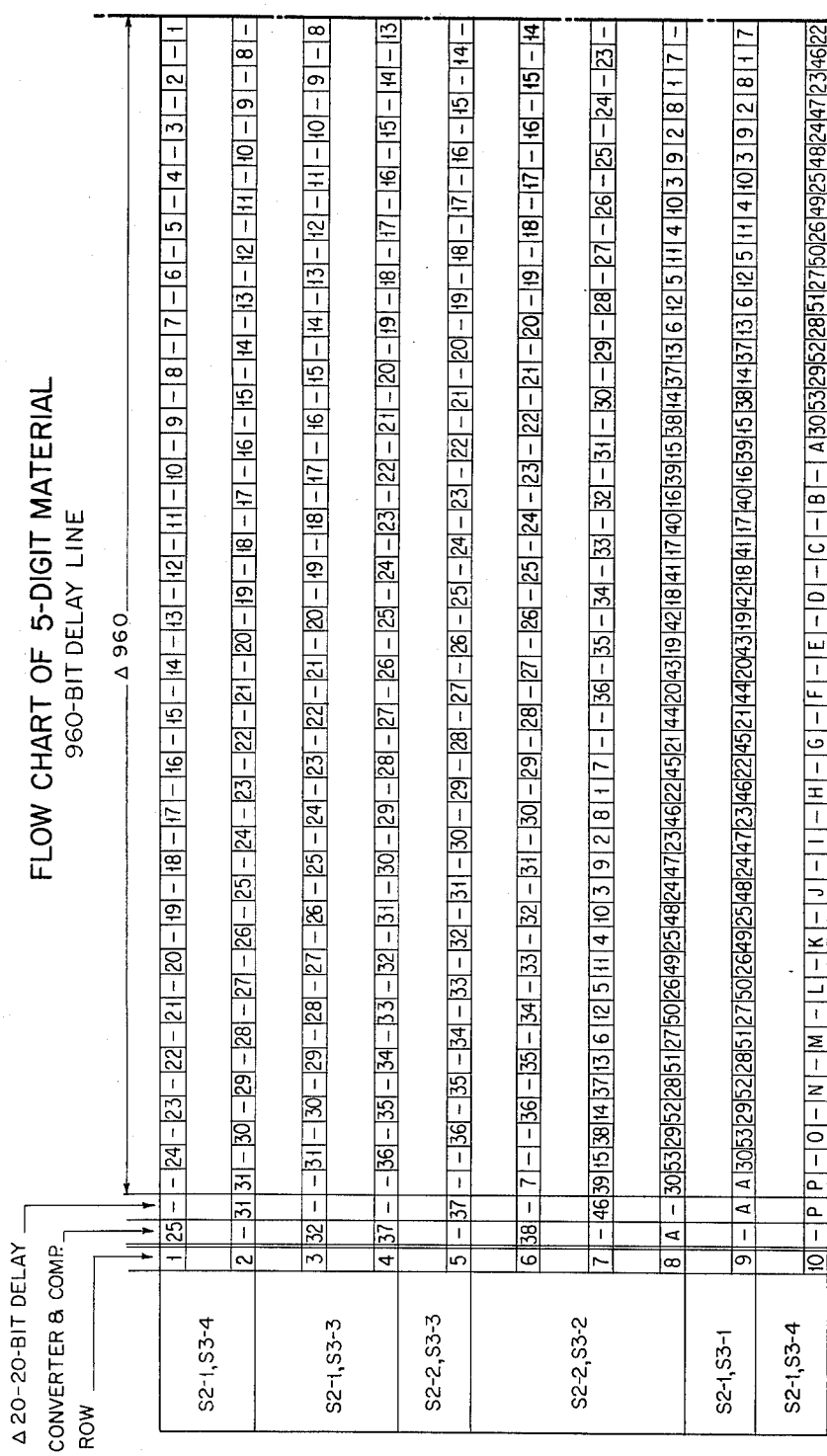
Figure 20B:
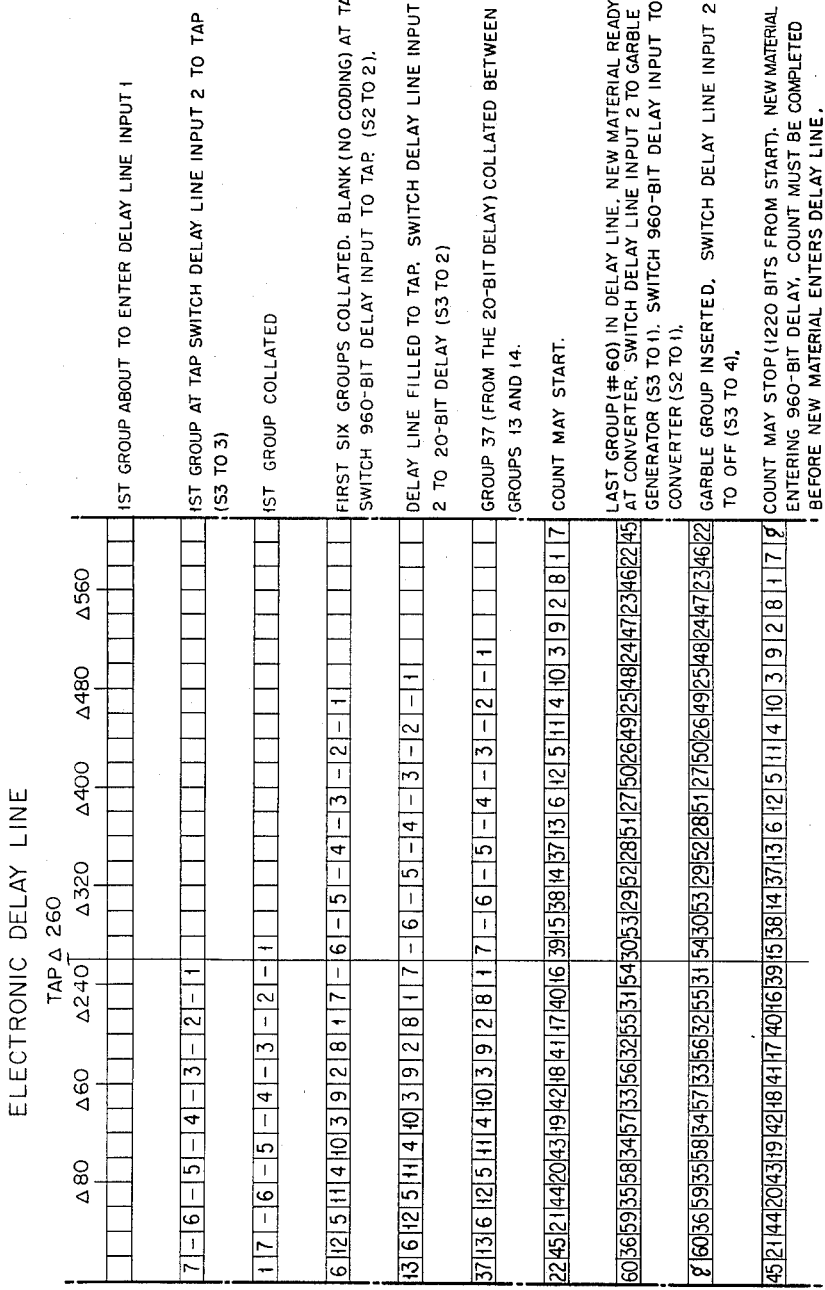

FIGS. 18a and 18b comprise a flow chart illustrating the operation of the arrangement of FIG. 17;

FIG. 19 is a basic flow diagram of the character group comparison system in accordance with the present invention arranged for pentagraph operation;

FIGS. 20a and 20b comprise a flow chart illustrating the operations of the arrangement of FIG. 19; and FIGS. 21–45 are schematic circuit diagrams of various components illustrated in block form in one or more of the preceding figures.

THE SYSTEM AS A WHOLE

The system of the present invention will be better understood if a specific embodiment is shown and described. In the embodiment here shown and described by way of example, the input comprises ten lines, each character or information item being indicated by a positive-going signal pulse appearing on one and one only of these lines at any given time. The absence of a signal pulse on all ten lines is an indication of a garble. The input information items are thus supplied serially, character by character. Each character time is divided into eight bits. The character time is 66⅔ microseconds and the bit time is 8⅓ microseconds.

The capacity of the machine is 300 characters. This may comprise 75 groups of four characters, called tetragraphs. For convenience, the characters comprising a tetragraph are designated ABCD, and those of a pentagraph ABCDE. In each case, character A is the one first presented in time at the input to the machine. The machine compares each group of characters with every other group, and produces an output signal whenever an identity is detected. The total number of such identities during the processing of a given batch of 300 characters is supplied by the machine in binary notation on a three-line output cable.

Figure 1:
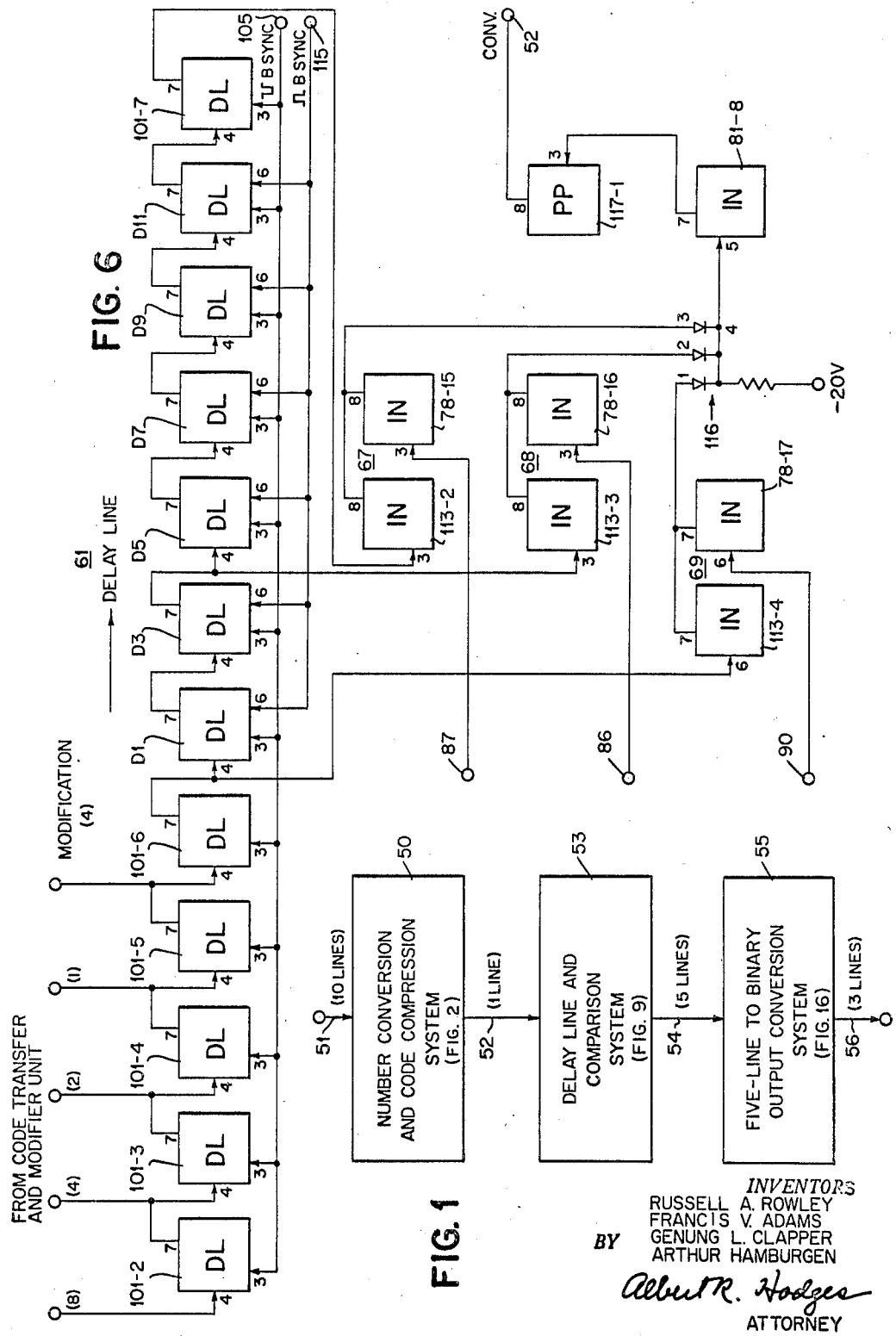
FIG. 1 is a basic block diagram of a character group comparison system in accordance with the present invention.

As shown in FIG. 1 of the drawings, the system as a whole comprises three principal subsidiary systems. The first such system, represented by box 50, is the number conversion and code compression system. Its input comprises a cable 51 having ten lines. Its output, comprising a single-line cable 52, supplies the delay line and comparison system represented by box 53. The output of system 53 is developed in a cable 54 having five lines, and is supplied to the five-line to binary output conversion system 55. The output of system 55, which is in binary notation, appears in cable 56 having three lines. Each of the three subsidiary systems comprising the system as a whole will now be separately described.

NUMBER CONVERSION AND CODE COMPRESSION SYSTEM

*General*

Figure 2:
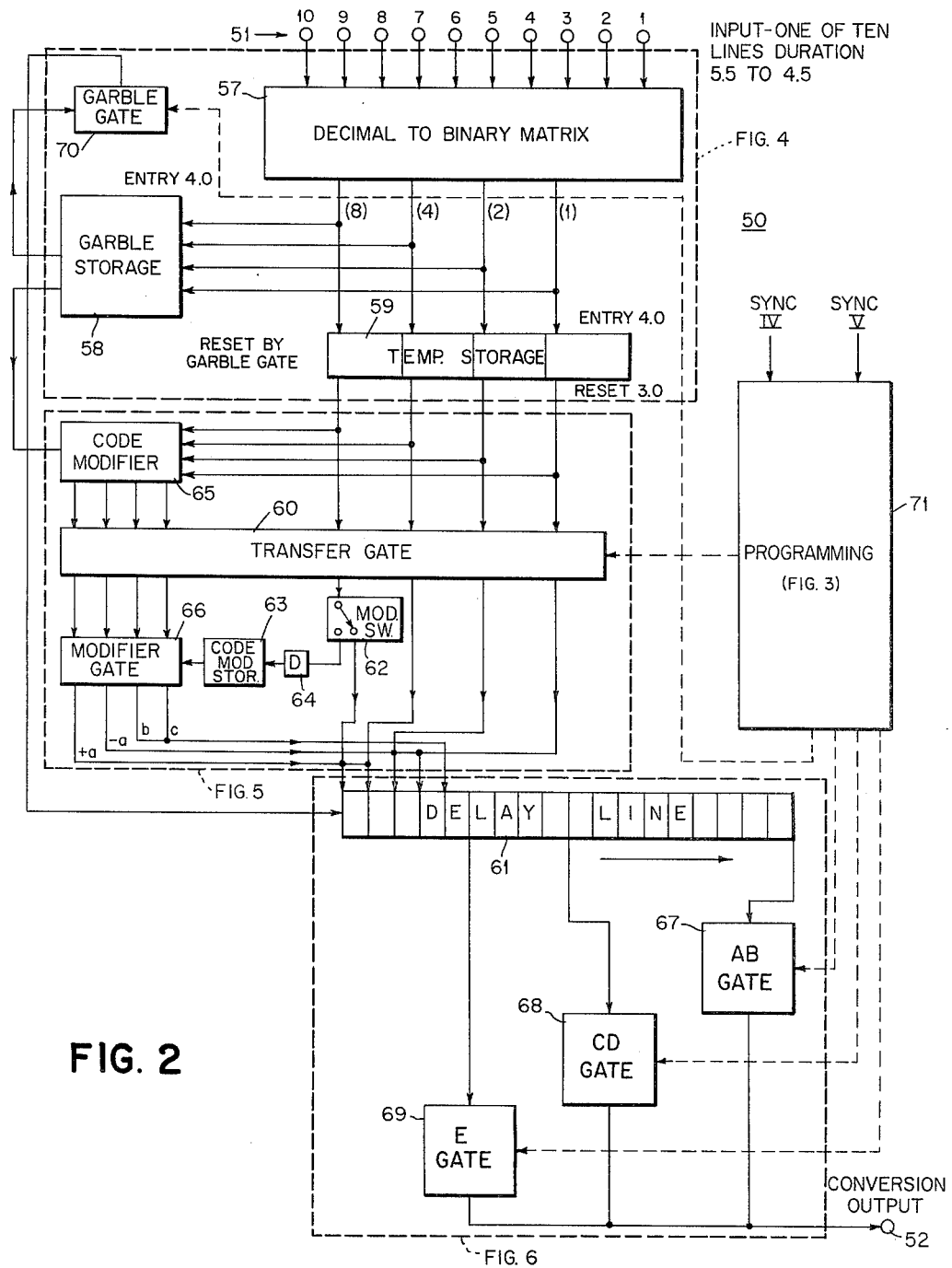
FIG. 2 is a block diagram of the number conversion and compression system comprising a portion of the basic system of FIG. 1.

The number conversion and code compression system 50, shown in block form in FIG. 2 of the drawings, is supplied with input information or characters in parallel decimal code, that is, only one of ten lines 51 is signalled at a time. This system converts each character as it arrives into a four-place binary number, compresses these binary numbers, assembles the information into groups in a delay line, and emits the grouped information in serial form on output line 52. The purpose of compressing the information in binary number form is to minimize the amount of storage facilities required. In the ordinary machine code, a total of 32 bits would be required to represent a tetragraph, or 40 bits to represent a pentagraph. After conversion and compression in accordance with an important feature of the present invention, however, the representation of a tetragraph requires only 14 bits, and the information contained in a pentagraph is represented by 18 bits. In addition, one machine bit time of the compressed code is reserved in each case for indicating garbles.

The processes of converting and compressing the information groups will be better understood by reference to Table I. In this table, the numbers before conversion are shown in column I, the presence of a garble being indicated by a comma. In columns II and III, an "*x*" is used to indicate the presence of a pulse. The "*g*" portion of column III represents the place reserved for a garble indication.

The number conversion operation is performed by first assembling the characters into digraphs or sub-groups of two, respectively designated AB and CD, as shown in column I of Table I. These sub-groups are then converted into binary notation, as shown in column II, each sub-group requiring a total of eight bit spaces. After compression in accordance with the present invention, however, each sub-group will require only seven bit spaces.

Code compression is accomplished by allowing the four-place binary code for the B or D to be recorded in a delay line, and then recording only the first three places of the four-place binary code for the A or C. The fourth place (8) is utilized for controlling the modification of the seven places of code which are used to record the two character sub-groups, AB or CD.

Modification of the seven-place code is accomplished, in accordance with the present invention, by adding pulses into certain bit positions of the seven-place code whenever a pulse is present in the 8 place position of the A′ or C′ binary code. Column III of Table I shows the seven-place code which results from this compression procedure, and the symbols in column IV of Table I, taken in conjunction with Table II, indicate the modification, if any, which has been made in each case. A tetragraph (DCBA) is composed of two groups (AB and CD) of a seven-place modified code for a total of 14 places. A fifteenth place is used for the garble indication. A pentagraph (EDCBA) is composed of two modified seven-place code groups (AB and CD) plus a four binary code group for fifth character E, to make a total of 18 places. A nineteenth place is required for the garble indication.

As shown in FIG. 2, lines 51 comprise the input to a decimal-to-binary matrix unit 57. The value of each input character is indicated by a signal on one and only one of these lines. Matrix unit 57 converts the parallel decimal input signal to a parallel binary representation indicated by the presence of a signal on one or more of the four output lines respectively designated 1, 2, 4 and 8. The absence of a signal on all four of these lines is an indication of a garble, and this condition is recognized by a garble storage unit 58, to the input of which these lines are connected. The binary output lines are also connected to a temporary storage unit 59, so that successive characters, one in each machine character time, are converted and replace the previous one in temporary storage unit 59. The garble indications are retained in garble storage unit 58 until the complete tetragraph or pentagraph has been received.

The first digit received is assumed to be character A. At the time this character is being transferred through a transfer gate 60 to a delay line 61, a modifier switch 62 is in its transferred position. Accordingly, if there is a bit in the 8 position of character A, this bit is eliminated from the transfer and is supplied to a code modifier storage unit 63 through a delay unit 64. When the next character, that is character B, is transferred from temporary storage unit 59 to delay line 61, modifier switch 62 is in its normal position (as shown in FIG. 2), so that the complete combination of four bits is transferred to the delay line.

In addition, the code stored in temporary storage unit 59 is supplied to a code modifier unit 65, which provides

*Table I*

[Conversion of 2-digit decimal number to 7-bit code]

| I | II | III | IV |
|---|---|---|---|
| A B / C D | A′ B′ / C′ D′ | A B / C D | |
| | 1248 1248 | 124 1248 g | |
| , , | ---- ---- | --- ---- x | |
| , 1 | ---- x--- | --- x--- x | |
| , 2 | ---- -x-- | --- -x-- x | |
| , 3 | ---- xx-- | --- xx-- x | |
| , 4 | ---- --x- | --- --x- x | |
| , 5 | ---- x-x- | --- x-x- x | |
| , 6 | ---- -xx- | --- -xx- x | |
| , 7 | ---- xxx- | --- xxx- x | |
| , 8 | ---- ---x | --- ---x x | |
| , 9 | ---- x--x | --- x--x x | |
| ,10 | ---- -x-x | --- -x-x x | |
| 1 , | x--- ---- | x-- ---- x | |
| 1 1 | x--- x--- | x-- x--- - | |
| 1 2 | x--- -x-- | x-- -x-- - | |
| 1 3 | x--- xx-- | x-- xx-- - | |
| 1 4 | x--- --x- | x-- --x- - | |
| 1 5 | x--- x-x- | x-- x-x- - | |
| 1 6 | x--- -xx- | x-- -xx- - | |
| 1 7 | x--- xxx- | x-- xxx- - | |
| 1 8 | x--- ---x | x-- ---x - | |
| 1 9 | x--- x--x | x-- x--x - | |
| 110 | x--- -x-x | x-- -x-x - | |
| 2 , | -x-- ---- | -x- ---- x | |
| 2 1 | -x-- x--- | -x- x--- - | |
| 2 2 | -x-- -x-- | -x- -x-- - | |
| 2 3 | -x-- xx-- | -x- xx-- - | |
| 2 4 | -x-- --x- | -x- --x- - | |
| 2 5 | -x-- x-x- | -x- x-x- - | |
| 2 6 | -x-- -xx- | -x- -xx- - | |
| 2 7 | -x-- xxx- | -x- xxx- - | |
| 2 8 | -x-- ---x | -x- ---x - | |
| 2 9 | -x-- x--x | -x- x--x - | |
| 210 | -x-- -x-x | -x- -x-x - | |
| 3 , | xx-- ---- | xx- ---- x | |
| 3 1 | xx-- x--- | xx- x--- - | |
| 3 2 | xx-- -x-- | xx- -x-- - | |
| 3 3 | xx-- xx-- | xx- xx-- - | |
| 3 4 | xx-- --x- | xx- --x- - | |
| 3 5 | xx-- x-x- | xx- x-x- - | |
| 3 6 | xx-- -xx- | xx- -xx- - | |
| 3 7 | xx-- xxx- | xx- xxx- - | |
| 3 8 | xx-- ---x | xx- ---x - | |
| 3 9 | xx-- x--x | xx- x--x - | |
| 310 | xx-- -x-x | xx- -x-x - | |
| 4 , | --x- ---- | --x ---- x | |
| 4 1 | --x- x--- | --x x--- - | |
| 4 2 | --x- -x-- | --x -x-- - | |
| 4 3 | --x- xx-- | --x xx-- - | |
| 4 4 | --x- --x- | --x --x- - | |
| 4 5 | --x- x-x- | --x x-x- - | |
| 4 6 | --x- -xx- | --x -xx- - | |
| 4 7 | --x- xxx- | --x xxx- - | |
| 4 8 | --x- ---x | --x ---x - | |
| 4 9 | --x- x--x | --x x--x - | |
| 410 | --x- -x-x | --x -x-x - | |
| 5 , | x-x- ---- | x-x ---- x | |
| 5 1 | x-x- x--- | x-x x--- - | |
| 5 2 | x-x- -x-- | x-x -x-- - | |
| 5 3 | x-x- xx-- | x-x xx-- - | |
| 5 4 | x-x- --x- | x-x --x- - | |
| 5 5 | x-x- x-x- | x-x x-x- - | |
| 5 6 | x-x- -xx- | x-x -xx- - | |
| 5 7 | x-x- xxx- | x-x xxx- - | |
| 5 8 | x-x- ---x | x-x ---x - | |
| 5 9 | x-x- x--x | x-x x--x - | |
| 510 | x-x- -x-x | x-x -x-x - | |
| 6 , | -xx- ---- | -xx ---- x | |
| 6 1 | -xx- x--- | -xx x--- - | |
| 6 2 | -xx- -x-- | -xx -x-- - | |
| 6 3 | -xx- xx-- | -xx xx-- - | |
| 6 4 | -xx- --x- | -xx --x- - | |
| 6 5 | -xx- x-x- | -xx x-x- - | |
| 6 6 | -xx- -xx- | -xx -xx- - | |
| 6 7 | -xx- xxx- | -xx xxx- - | |
| 6 8 | -xx- ---x | -xx ---x - | |
| 6 9 | -xx- x--x | -xx x--x - | |
| 610 | -xx- -x-x | -xx -x-x - | |
| 7 , | xxx- ---- | xxx ---- x | |
| 7 1 | xxx- x--- | xxx x--- - | |
| 7 2 | xxx- -x-- | xxx -x-- - | |
| 7 3 | xxx- xx-- | xxx xx-- - | |
| 7 4 | xxx- --x- | xxx --x- - | |
| 7 5 | xxx- x-x- | xxx x-x- - | |
| 7 6 | xxx- -xx- | xxx -xx- - | |
| 7 7 | xxx- xxx- | xxx xxx- - | |
| 7 8 | xxx- ---x | xxx ---x - | |
| 7 9 | xxx- x--x | xxx x--x - | |
| 710 | xxx- -x-x | xxx -x-x - | |
| 8 , | ---x ---- | --- ---- x | s |
| 8 1 | ---x x--- | --- x-xx - | -a |
| 8 2 | ---x -x-- | --- -xxx - | -a |
| 8 3 | ---x xx-- | --- xxxx - | -a |
| 8 4 | ---x --x- | --x --xx - | -a b |
| 8 5 | ---x x-x- | --x x-xx - | -a b |
| 8 6 | ---x -xx- | --x -xxx - | -a b |
| 8 7 | ---x xxx- | --x xxxx - | -a b |
| 8 8 | ---x ---x | --- --xx - | -a |
| 8 9 | ---x x--x | --- xx-x - | +a |
| 810 | ---x -x-x | --x xx-x - | +a c |
| 9 , | x--x ---- | x-- ---- x | s |
| 9 1 | x--x x--- | x-- x-xx - | -a |
| 9 2 | x--x -x-- | x-- -xxx - | -a |
| 9 3 | x--x xx-- | x-- xxxx - | -a |
| 9 4 | x--x --x- | x-x --xx - | -a b |
| 9 5 | x--x x-x- | x-x x-xx - | -a b |
| 9 6 | x--x -xx- | x-x -xxx - | -a b |
| 9 7 | x--x xxx- | x-x xxxx - | -a b |
| 9 8 | x--x ---x | x-- --xx - | -a |
| 9 9 | x--x x--x | x-- xx-x - | +a |
| 910 | x--x -x-x | x-x xx-x - | +a c |
| 10 , | -x-x ---- | -x- ---- x | s |
| 10 1 | -x-x x--- | -x- x-xx - | -a |
| 10 2 | -x-x -x-- | -x- -xxx - | -a |
| 10 3 | -x-x xx-- | -x- xxxx - | -a |
| 10 4 | -x-x --x- | -xx --xx - | -a b |
| 10 5 | -x-x x-x- | -xx x-xx - | -a b |
| 10 6 | -x-x -xx- | -xx -xxx - | -a b |
| 10 7 | -x-x xxx- | -xx xxxx - | -a b |
| 10 8 | -x-x ---x | -x- --xx - | -a |
| 10 9 | -x-x x--x | -x- xx-x - | +a |
| 1010 | -x-x -x-x | -xx xx-x - | +a c |

*Table II*

| Class | Condition in B′ D′ | Bits added in A C | Bits added in B D |
|---|---|---|---|
| +a | 8 and (2 or 1) | | 1 and 2 |
| -a | No [8 and (2 or 1)] | | 4 and 8 |
| b | 4 | 4 | |
| c | 8 and 2 | 4 | |
| s | Presence of garble indication suppresses modification of class -a for that character and all succeeding characters in the group. | | | outputs in accordance with the conditions set forth in Tables I and II. These outputs are passed through transfer gate 60 to a modifier gate unit 66. When the transfer of character B from temporary storage unit 59 to delay line 61 is accomplished by the opening of transfer gate 60, additional pulses will also be entered into delay line 61 from code modifier unit 65 provided modifier gate unit 66 is open, a condition which exists if the previous character A had a bit in the 8 position, this bit having been delayed by unit 64 and supplied through code modifier storage unit 63 to modifier gate unit 66.

The character sub-group CD is handled in a similar manner to the sub-group AB just discussed. In the case of a pentagraph, character E is transferred at a time when modifier switch 62 is in its normal position. At this time, code modifier gate 66 will be closed, so the combination of four bits representing character E will be entered into delay line 61 with no alterations. It will be understood that modifier switch 62, although shown for the sake of simplicity as a plain mechanical switch, actually is an electronic switch capable of extremely rapid operation.

Delay line 61 performs the normal function of converting the parallel pulses supplied to it into the serial form. By means of the taps on this delay line and the AB, CD and E gates, respectively designated by reference numerals 67, 68 and 69, the bits emerging from delay line 61 are compressed into a continuous series, this series of output pulses occurring on output line 52. As shown, the five information inputs to delay line 61 are introduced respectively before the first, second, third and fourth units of the delay line; and the three outputs, supplied respectively to E gate 69, CD gate 68 and AB gate 67, are taken after the fifth, ninth and eighteenth units of the delay line. In addition, the garble signal, if needed, is supplied from garble storage unit 58 through a garble gate 70, to the first unit of delay line 61. The resultant garble indication immediately follows the E bits and emerges through E gate 69.

The arrangement just described is used for pentagraphs. For a four-digit or a tetragraph group, the conditions are similar except there are no character E pulses, E gate 69 does not operate, and the garble indication is entered immediately following the D bits and comes out with the CD bits through CD gate 68. Whether the system is set for tetragraphs or pentagraphs is determined by a programming unit 71, to which is supplied either IV sync or V sync synchronizing pulses. Each of the several groups of components will now be described separately, beginning with the programming unit, reference being made to the appropriate figures of the drawings as indicated in FIG. 2.

*Programming unit*

Number conversion programming unit 71, shown in FIG. 3, generates the timing signals which are used in the number conversion and code suppression system (FIG. 2), this being accomplished by means of two trigger rings. A first open-ended ring, comprising trigger units 72–1, 72–2 and 72–3, is utilized during tetragraph operation. A six-trigger open-ended ring comprising trigger units 72–4 through 72–9, is utilized during pentagraph operation. After the first trigger unit in either ring has been turned ON, the corresponding ring is advanced by 7.5 sync signals applied to a terminal 73 from a suitable source (not shown) and inverted by an inverter unit 74–1. A switch 75 serves to determine which of the two trigger rings is to be used. During tetragraph operation, switch 75 allows IV sync signals from a source 76 to be applied through an inverter unit 74–2 to turn ON trigger unit 72–1 of the tetragraph ring, thus permitting this ring to operate. During pentagraph operation, switch 75 causes V sync signals to be applied from source 76 through an inverter unit 74–3 to trigger unit 72–4, the first trigger unit of the pentagraph ring. As will be apparent from the diagrammatic representation of switch 75, only one trigger ring may be rendered operative at a given time.

The outputs of trigger units 72–4, 72–6, 72–8, 72–1 and 72–3 are mixed in a vacuum tube mixer circuit comprising inverter units 77–1, 77–2, 78–1, 77–3 and 77–4, passed through an inverter unit 79–1, and used to control switching unit 80–1. While any one of the trigger units connected to this mixer circuit is ON, the left-hand or switching portion of unit 80–1 will allow 2.0 and 5.0 sync pulses, applied respectively to terminals 6 and 2 of this switching unit from a suitable source (not shown), to pass through the diode mixer portion of unit 80–1 and on to an inverter unit 81–1, the output of which appears at a terminal 82 and serves as the control signal for transfer gate 60 (FIGS. 2 and 5).

During the time trigger unit 72–4 is enabling switching unit 80–1, a special arrangement is used to prevent the 2.0 sync pulses from passing through the switching unit, in order to prevent character E of a pentagraph from being transferred until 5.0 sync time. This is accomplished by turning a trigger unit 72–10 ON with the same pulse from inverter unit 74–3 that turned trigger unit 72–4 ON, and then turning trigger unit 72–10 OFF with a 3.0 sync pulse applied to a terminal 83 from a suitable source (not shown) and inverted by an inverter unit 74–4. While trigger unit 72–10 is ON, it causes an inverter unit 78–2 to conduct and thus to prevent a signal from inverter unit 79–1 from enabling switching unit 80–1. The inverted 3.0 and 7.5 sync pulses as available respectively at terminals 84 and 89, are also supplied to code modifier unit 65 (FIGS. 2 and 5).

An output of trigger unit 72–1 is mixed with the output of trigger unit 72–9, by means of inverter unit 85–1 and 85–2, to provide the CD gate signal at a terminal 86. This is accomplished by utilizing a single plate load for the two inverters, so that a signal will be provided at terminal 86 when either of these trigger units is ON.

The output of trigger unit 72–1 is also mixed with the output of trigger unit 72–8 by means of inverter units 85–3 and 85–4 to provide an AB gate signal at a terminal 87. Either of these two trigger units, while ON, will send a signal to terminal 87, since these two inverters are connected to have a common plate load.

The output of trigger unit 72–1 is inverted by an inverter unit 78–3, the output of which is utilized to operate a portion of a switching unit 80–2 which controls the flow of 6.0 sync pulses applied to its terminals 1 and 5. While trigger unit 72–1 is ON, this portion of switching unit 80–2 is enabled, so that the 6.0 sync pulses are able to pass through the switch and through a pair of inverters 74–5 and 74–6 to a terminal 88. The resultant pulses at this terminal serve to control garble gate 70 (FIGS. 2 and 4).

The output of trigger unit 72–4 is also inverted by an inverter unit 78–4 and used to operate a portion of switching unit 80–2, to which 6.0 sync pulses are applied as just mentioned. While trigger unit 72–4 is ON, the 6.0 sync pulses are permitted to pass through switching unit 80–2 and to reach an inverter unit 79–2 the output of which is supplied to a trigger unit 72–11. The application of each sync pulse turns ON the trigger unit, resulting in the initiation of an E gate signal at a terminal 90. Trigger unit 72–11 is turned OFF, to terminate the E gate signal, by means of a 4.0 sync pulse applied to a terminal 91 from a suitable source (not shown) and passed through an inverter unit 74–7, the output of which is also supplied to a terminal 92 for the control of temporary storage unit 59 (FIGS. 2 and 4).

Figure 15A:
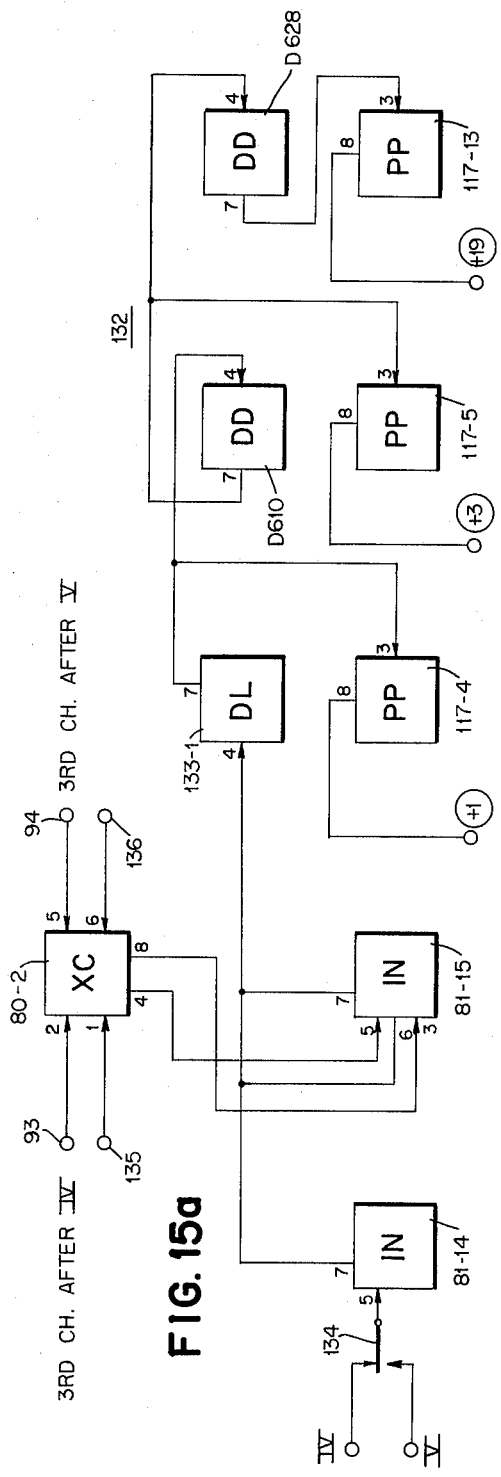
FIG. 15a is a block diagram of the synchronizing generator associated with the comparison system of FIG. 13.

Trigger units 72–3 and 72–6 send signals respectively through inverter units 78–5 and 78–6 to provide signals respectively at terminals 93 and 94 which are utilized for controlling the comparison sync generation circuit (FIG. 15a).

Matrix, temporary storage and garble storage units

FIG. 4 shows the decimal-to-binary matrix unit, the temporary storage unit and the garble storage unit, respectively designated by reference numerals 57, 59 and 58 in FIG. 2. The matrix unit comprises a conventional matrix employing a plurality of crystal diodes. The input of this matrix comprises the ten lines forming cable 51 (FIGS. 1 and 2), the value of the input signal being indicated by a signal on one and one only of these lines. This signal extends from 5.5 time in one character interval to 4.5 time in the next character interval. The output of the matrix comprises four lines, signalled in the proper combination to indicate the binary code equivalent of the signalled input lines. Output lines 1, 2, 4 and 8 are supplied respectively to inverter units 74–7, 74–8, 74–9 and 74–10. The outputs of these inverter units are supplied to temporary storage unit 59 and garble storage unit 58.

Temporary storage unit 59 accepts the binary coded information from matrix unit 57 at 4.0 time and stores this information until the following 3.0 time. While this information is held in the temporary storage unit, it is made available to the code transfer and modifier unit (FIGS. 2 and 5). The four inputs to the temporary storage unit are supplied respectively to four negative coincidence circuits 95, 96, 97 and 98. These coincidence circuits are enabled at 4.0 time by the inverted 4.0 sync pulse which is applied to terminal 92 (also in FIG. 3). While the coincidence circuits are enabled, the information from matrix unit 57 is permitted to turn ON those of storage triggers 72–12, 72–13, 72–14 and 72–15 corresponding with the signalled lines. These trigger units remain turned ON until they are returned to their OFF condition by the inverted 3.0 sync pulse which is applied to terminal 84 (also in FIG. 3). The outputs from trigger units 72–12 and 72–13, corresponding respectively with lines 1 and 2, are supplied in both polarities. The outputs of the remaining two trigger units, corresponding with lines 4 and 8, are supplied only as negative-going signal pulses. These four outputs are supplied to the code transfer and modifier unit shown in FIGS. 2 and 5.

Garble storage unit 58 serves to check the output of matrix unit 57 for the lack of a signal on all four of its output lines at 4.0 time. Such an absence of a signal is interpreted as a garble, and this indication is held in the garble storage unit for a predetermined length of time. One output of the garble storage circuit passes through garble gate 70 (FIG. 2) and then reaches conversion delay line 61 (FIGS. 2 and 6). The second output of the garble storage unit is presented to code modifier unit 65 (FIGS. 2 and 5).

When all four output lines of matrix 57 are not signalled, they will be up in potential with the result that a positive coincidence switching circuit 99 will send a positive-going signal to an inverter unit 79–3. The output of this inverter unit enables a negative coincidence switching circuit 100, which in turn permits the inverted 4.0 sync signal present at terminal 92 (also in FIG. 3) to pass through the switching circuit and turn on trigger unit 72–16. This trigger unit will remain in its ON condition until it is reset at 7.0 sync time by the garble gate signal applied to terminal 88 (also in FIG. 3), as first inverted by an inverter unit 81–2 and then delayed by a delay unit 101–1. The latter unit is synchronized by the application of negative-going basic sync pulses, occurring once each character time, to terminal 105 from a suitable source (not shown). The use of the inverted and delayed garble gate signal present at terminal 88 thus to reset trigger unit 72–16 insures that the resetting of this trigger unit takes place immediately after the information contained in it has been used. The output appearing on terminal 8 of trigger unit 72–16 is passed through an inverter unit 78–7 and utilized to control a negative coincidence switching circuit 102, which will allow the garble gate signal present at terminal 88 (also in FIG. 3) to reach a terminal 103 while trigger unit 72–16 is ON. Terminal 103 serves to supply a garble signal to conversion delay line 61 (FIGS. 2 and 6).

The output at terminal 7 of trigger unit 72–16 is passed through an inverter unit 78–8 and supplied to a terminal 104. This terminal is connected to code modifier unit 65 (FIGS. 2 and 5).

Code transfer and modifier unit

The code transfer and modifier unit, shown in FIG. 5, utilizes the transfer gate signals from programming unit 71 (FIGS. 2 and 3) to transfer the information contained in temporary storage unit 59 (FIG. 4) into conversion delay line 61. The interconnections of these units are indicated diagrammatically in FIG. 2 of the drawings. During the time that the A and C characters are being transferred, the information contained on the 8 line will be used to control the output of code modifier unit 65. During the time the B, D and E characters are being transferred, the information contained on the 8 line is permitted to reach conversion delay line 61. Whenever the A or C character contains a signal on the 8 line, selected pulses will be added into the code for the B or D character and, either in addition or alternatively, into the 4 position of the A or C character. This is done to eliminate the need for the pulse in the 8 position of the A or C character, thus making it possible to represent the AB and CD digraphs with seven bits instead of the eight bits which would otherwise be required. As previously pointed out, Tables I and II indicate the pulses which are added to accomplish this modification of the code, in accordance with an important feature of the present invention.

The negative-going signal outputs on lines 1, 2, 4 and 8, representing the output of temporary storage unit 59 (FIG. 4), serve as the inputs respectively to inverter units 78–9, 78–10, 78–11 and 78–12. The positive-going output signals on lines 1 and 2 are supplied to the inverter unit 85–5 forming a part of code modifier unit 65. The outputs of inverter units 78–9 through 78–11 serve respectively as one input of double positive coincidence crystal diode switches 106–1, 106–2 and 106–3. The other input of each of these switches comprises the transfer gate signal applied at terminal 82 (also in FIG. 3) after it has passed through a driver unit 107–1. Thus these switches will develop a positive-going output signal when both the input from the associated inverter unit and the amplified transfer gate signal are positive simultaneously. The outputs of inverter units 78–10 through 78–12, associated respectively with lines 2, 4 and 8, are also supplied to code modifier unit 65.

A switching unit 108 comprising two triple positive coincidence crystal diode switches is associated with inverter unit 78–12 the input of which is the 8 line. One input of each of these switches is the output of inverter unit 78–12. Another input of each of these switches is the amplified transfer gate signal applied to terminal 82. For the purpose of providing the third inputs for the two switches of unit 108, there is provided a trigger unit 72–17, which is turned ON by the inverted 3.0 pulse at terminal 84 and turned OFF by the inverted 7.5 pulse at terminal 89, both of these terminals also being shown in FIG. 3. The outputs of trigger unit 72–17 are connected to a double inverter unit 78–13, the inverted outputs of which in turn are connected respectively to the third inputs of the switches of unit 108. While trigger unit 72–17 is ON, it will enable the upper portion of switching unit 108, so that information on the 8 line is permitted to pass through switching unit 108 when the 5.0 transfer gate pulse occurs. Since the B, D and E characters are transferred at 5.0 time, the corresponding signal pulses are permitted to reach conversion delay line 61 (FIG. 6) without alteration. While trigger unit 72–17 is OFF, the lower portion of switching unit 108 will be enabled when the transfer gate pulse appears at 2.0 time, so that the signal on line 8 is developed on a line 109. Since the A and C characters are transferred at 2.0 time, the signal on line 8 corresponding with these characters will appear on line 109.

The outputs of switches 106–1, 106–2 and 106–3 and the upper portion of switch 108 are supplied through inverter units 81–3 through 81–6 to output lines 1, 2, 4 and 8.

Each character presented to the code transfer and modifier unit of FIG. 5 causes code modifier unit 65 to determine the modification required to indicate the presence of a signal on the 8 line of the preceding character. These modifying pulses are prevented from affecting the code appearing on the four output lines, unless the preceding character had a signal on the 8 line, by means of code modifier gate unit 66. Since the signal on the 8 line during the transfer of a B, D or E character cannot affect trigger unit 72–18, due to the fact that the lower portion of switching unit 108 is disabled at this time, it cannot cause the code of the following character to be modified. A signal on the 8 line during the transfer of an A or C character, however, will be supplied by line 109 to a delay or pulse former unit 110, the delayed output signal of which is used to turn ON trigger unit 72–18. Pulse former unit 110 delays the 2.0 signal from the 8 input line for a sufficient interval of time to insure that the four modification signal lines, respectively designated $b$, $c$, $+a$ and $-a$ have first been disabled by switching diodes 110 by the return of terminal 82 to its normal potential following a transfer gate signal pulse. In this manner, trigger unit 72–18 is prevented from turning ON in time to allow the modification due to the A or C character from affecting the code from the A or C character. Trigger unit 72–18 is turned OFF by the following inverted 7.5 pulse applied at terminal 89.

While trigger unit 72–18 is ON (3.0 to 7.5 time), it will send a signal through a cathode follower unit 111–1 to enable modifier gate 66 comprising a plurality of crystal diode switches arranged as shown. When the B or D character is transferred at 5.0 time, the transfer gate signal applied at terminal 82 will also enable all four modification signal lines $b$, $c$, $+a$ and $-a$, these lines being selected according to the B or D character. Modification signal lines $b$ and $c$ are connected respectively through mixer units 112–1 and 112–2 to a modification 4 output line. Modification signal line $+a$ is connected through mixer units 112–3 and 112–4 respectively to output lines 1 and 2. Modification signal line $-a$ is connected through mixer units 112–5 and 112–6 respectively to output lines 4 and 8.

Whenever a modification is required, either the $+a$ or $-a$ modification line will be able to enter pulses into the output lines. The modification due to the signals from one of these modification signal lines may be further modified by a signal from the $b$ or $c$ signal modification line. The $+a$ line will be able to send a pulse to the 1 and 2 output lines when the B or D character contains a signal on the 8 line and on the 1, 2, or 1 and 2 lines. This is accomplished by mixing the signals on the 1 and 2 input lines in inverter unit 85–5, the output of which is used to enable one leg, comprising inverter unit 78–14, of a coincidence switch the other leg, comprising inverter unit 113–1 is enabled by a signal from the 8 input line. When both legs of this coincidence switch are signalled simultaneously, the $+a$ modification signal line will be able to send signals to output lines 1 and 2, provided the modifier gate signal at terminal 89 and at transfer gate signal at terminal 82 are also present.

During the time that the $+a$ modification signal line is not selected by the signals on the 8, 1 and 2 input lines, the $-a$ modification signal line will be enabled by the signal from the $+a$ line as inverted by inverter unit 74–11, provided line $-a$ is not disabled by the presence of a garble signal on terminal 104 (also in FIG. 4). The $-a$ modification signal line, while thus selected, will be able to send signals through mixer units 112–5 and 112–6 respectively to the 4 and 8 output lines when the modifier gate and transfer gate signals are also present respectively at terminals 89 and 82. The $b$ modification signal line is selected when a signal exists on input line 4. When this line is thus selected and enabled by the presence of modifier gate and transfer signals, it is permitted to enter a signal into the 4 position of the previous character by entering it, through mixer unit 112–1, on the modification 4 output line.

The $c$ modification signal line is selected when a signal exists on both the 2 and 8 input lines. If this line is enabled by the presence of the modifier and transfer gate signals while it is selected, it will also cause a signal to be placed on the modification 4 output line, in this case through mixer unit 112–2.

The garble signal is supplied to the 8 output line through an inverter unit 81–7, the input of which is connected to terminal 103 (also in FIG. 4). The timing is such that the garble indication pulse is placed in the fifteenth bit position of a tetragraph or in the nineteenth bit position of a pentagraph.

*Conversion delay line and output unit*

The conversion delay line and output unit of FIG. 6 assembles and converts the information received from the code transfer and modifier unit of FIG. 5, to provide a serial code of 15 consecutive bits during tetragraph operation and of 19 consecutive bits while handling pentagraphs. This is accomplished by entering the input information into a delay line, where it is stored until the information can be read out in serial form.

Conversion delay line 61 comprises six single delay units 101–2 through 101–7, and six double delay uits respectively designated D1, D3, D5, D7, D9 and D11, these single and double delay units being connected in sequence as shown to collectively form a delay line providing eighteen separate delay steps. The signals are advanced step by step through the delay line by negative-going basic synchronizing pulses at terminal 105 (also in FIG. 4) applied to all of the delay units and by the application of positive-going basic synchronizing pulses, present at a terminal 115, to each of the double delay units.

The signals on input lines 8, 4, 2, 1 and modification 4 are applied respectively to the inputs of single delay units 101–2 through 101–6. The output of double delay unit 101–7, which is at the end of the delay line and hence after the eighteenth unit of delay, is supplied to AB gate 67 comprising inverter unit 113–2 and inverter unit 78–15. The input to the latter unit is the AB gate signal applied to terminal 87 (also in FIG. 3). Following the ninth unit of delay, that is, at the output of double delay unit D3, a connection is made to CD gate 68 comprising inverters 113–3 and 78–16, the input to the latter unit comprising the CD gate signal applied to terminal 86 (also in FIG. 3). The output of delay unit 101–6, which follows the fifth unit of delay, is supplied to E gate unit 69 comprising inverter units 113–4 and 78–17. As before, the input to the latter unit comprises the E gate signal applied to terminal 90 (also in FIG. 3).

The outputs of gate units 67, 68 and 69 are supplied through a diode coincidence switch 116, an inverter unit 81–8 and a push-pull driver unit 117–1 to output terminal 52 (also in FIG. 2).

The information received from the code transfer and modifier unit of FIG. 5 is a combination of signals on the 1, 2 and 4 lines at 2.0 time of the A and C characters, and a combination of signals on the 1, 2, 4, 8 and modification 4 lines at 5.0 time of the B and D characters. During pentagraph operation, the information concerning the fifth or E character is received as a combination of signals on the 1, 2, 4 and 8 lines at 5.0 time of the E character. When the group contains a garble, a signal indicating this garble will be received at 6.0 time of the last character used in the group. Since the information is advanced through delay line 61 by basic synchronizing pulses occurring once each character time, the information received at 5.0 time normally will be placed in the delay line immediately after the information received at 2.0 time has cleared the units of the line to be entered, with the exception that a signal on the modification 4 line can affect the signal previously received on line 4 at 2.0 time. In this manner, the delay line is caused to store a group of seven bits due to the A and B characters and a group of seven bits due to the C and D characters, these two groups being separated by a group of nine bits. When the E character is used, the group of four bits representing it will be separated from the CD group by four bits. The pulse representing the garble is in the bit position immediately following the last used character. Gates 67, 68 and 69 serve to sample the signals passing through delay line 61 in such a manner as to eliminate the unused bits between the groups of bits representing characters.

Figure 7:
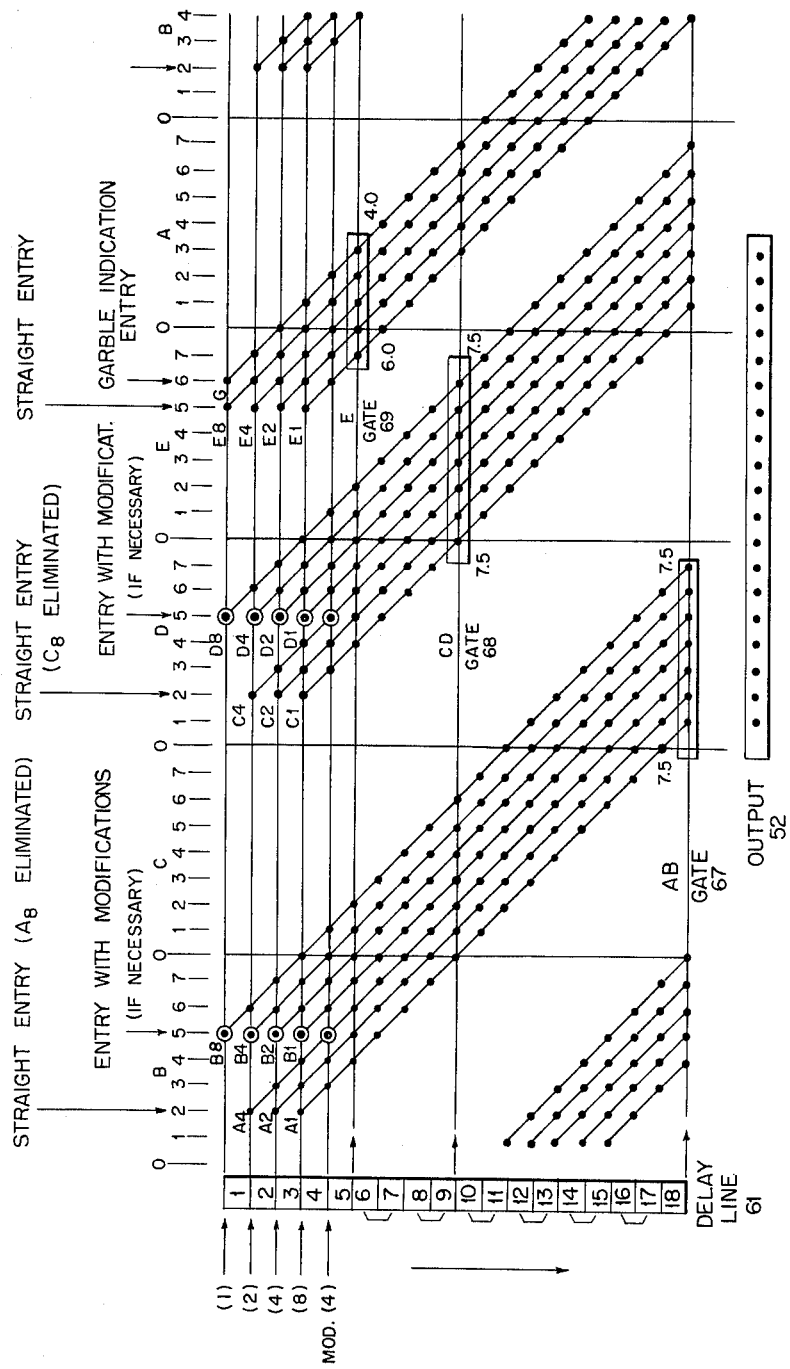
FIG. 7 is a chart diagrammatically representing the operation of the conversion delay line of FIG. 6.

The operation of the conversion delay line and output unit of FIG. 6 will be better understood by reference to the chart of FIG. 7. In this chart, time is indicated from left to right and is measured by the character bit index near the top. The eighteen delay steps or units of delay line 61 are indicated by the correspondingly numbered boxes extending from top to bottom at the left-hand edge of the chart. The first character group timing shown is that of the B character. After the signals due to a character have entered the delay line at the points indicated by the five arrows at the upper left-hand portion of the chart, the signals will be advanced through the delay line as shown by the sloping lines. The dots on the sloping lines indicate the positions of the signals after each basic synchronizing pulse. The encircled dots indicate where modification pulses are added, if they are required. The dots enclosed in each rectangle indicate the positions the signals reach when they are permitted to be read out by the correspondingly indicated output gate. The consolidation of these rectangle enclosed dots is indicated by the large rectangle at the bottom of the chart and represents the output as developed at terminal 52. The example shown in the chart of FIG. 7 is a pentagraph, but it will be understood that the operation in the case of a tetragraph will be closely similar.

*Timing chart for conversion and compression system*

Figure 8:
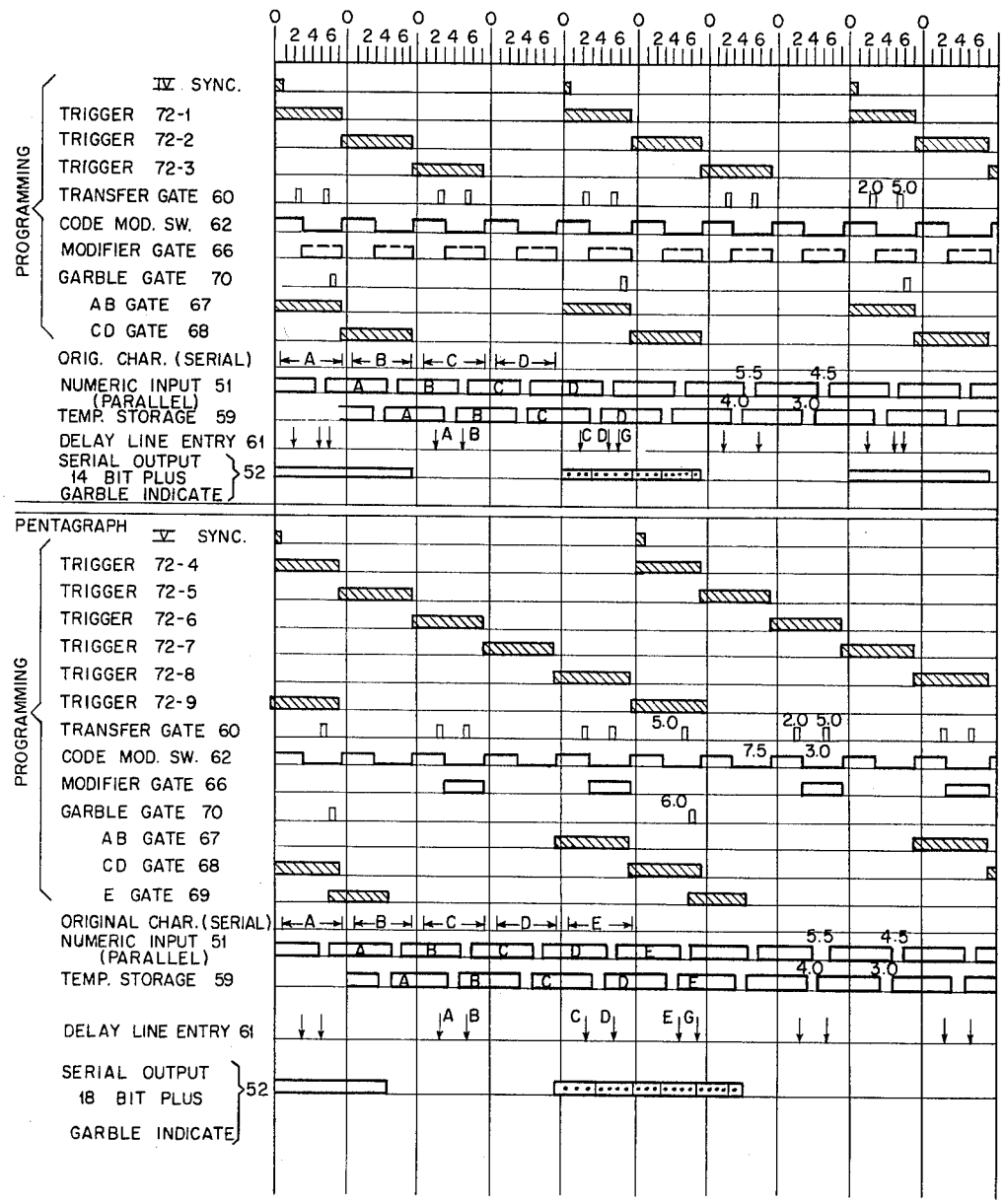
FIG. 8 is a timing chart representing the operation of the number conversion and compression system of FIG. 2.

The overall operation of the number conversion and code compression system, shown in block form in FIG. 2 and in greater detail in FIGS. 3–6, will be better understood by reference to the timing chart of FIG. 8. The upper portion of this chart relates to tetragraph operation, and the lower portion to pentagraph operation. The first section of each portion of the chart relates to programming, in that it depicts the operating cycles of the various trigger units and gates. The lower section of each portion of the chart illustrates graphically the conversion and compression of the coded information in accordance with the invention.

It will be readily apparent from the chart of FIG. 8 that a substantial reduction in the number of bits required to represent a group of characters is achieved. Referring first to tetragraph operation, the original presentation of the four characters comprising a group requires a total of 32 bits of the ordinary machine code. After conversion and compression, however, this same group of characters or information items requires only 15 bits, including one bit for garble indication. Turning now to pentagraph operation, it will be seen that the 40 bits required to represent the five characters comprising a group in this case are replaced by only 19 bits, including one bit to indicate the presence of a garble.

The apparatus which has been described in this section of this specification is supplied with input information or characters in parallel decimal code, converts each character as it arrives into a four-place binary digit, compresses the resultant binary nnumber, assembles the compressed information into group corresponding to a num- in a delay line, and emits the grouped information in serial form on a single output line. The output information in this form is especially adapted for use in the delay line and comparison system (53 in FIG. 1) which comprises the second major subsidiary system of the present invention. This system will now be described.

DELAY LINE AND COMPARISON SYSTEM

General

The delay line and comparison system, represented by block 53 in FIG. 1, receives information in serially coded form. It comprises an electronic delay line which is capable of storing 600 bits of information. This is equivalent to 37 sixteen-bit groups during tetragraphic operation, or 30 twenty-bit groups during pentagraphic operation. It will be recalled that, in the compressed code comprising the output of the number conversion and compression system (FIG. 2), a tetragraph requires fifteen bits and a pentagraph requires nineteen bits. The extra bit allows time for switching between groups if desired. Thirty-seven comparison circuits are provided, and these are permanently connected to the electronic delay line in such a manner as to allow every group of information items stored in the delay line to be compared with every other group.

The size of the groups to be compared, that is, whether they are tetragraphs or pentagraphs, is first selected by the suitable actuation of a number of control relays. These relays control the circuits of the number conversion and compression system, as described in connection with FIG. 2, and also determine the direction in which the information flows through the electronic delay line. When the relays are in their normal or released positions, the circuits are set for tetragraphic operation. When the relays are in their picked or actuated condition, the system is ready for pentagraphic operation. In tetragraphic operation all 37 comparison circuits are used, but during pentagraphic operation only 30 of the comparison circuits are used. The comparison circuits send an output signal to the five-line-to-binary conversion system (block 55 in FIG. 1) every time the two groups presented to a comparison circuit are found to be identical. The input information supplied to the electronic delay line is also made available at an output tap after 240 bits of delay during tetragraphic operation or after 260 bits of delay during pentagraphic operation.

Electronic delay line

The electronic delay line contains 307 double delay units each of which is capable of storing pulsed information for two bits of time. These delay units are interconnected through relays to provide 600 bits of storage during both tetragraphic and pentagraphic operation. The extra storage provided by the extra seven double delay units facilitates switching between the two modes of operation. In accordance with an important feature of the present invention, this interconnection through the relays enables 37 comparison circuits, permanently connected to the output of 74 delay units, to make all of the required comparisons. The selective routing of the information through the delay line compensates for the difference in the number of bits in the tetragraphs and pentagraphs. The outputs of all the delay units are synchronized by a common synchronizing pulse, thus permitting these outputs to be directly compared in the respective comparison circuits.

Figure 9:
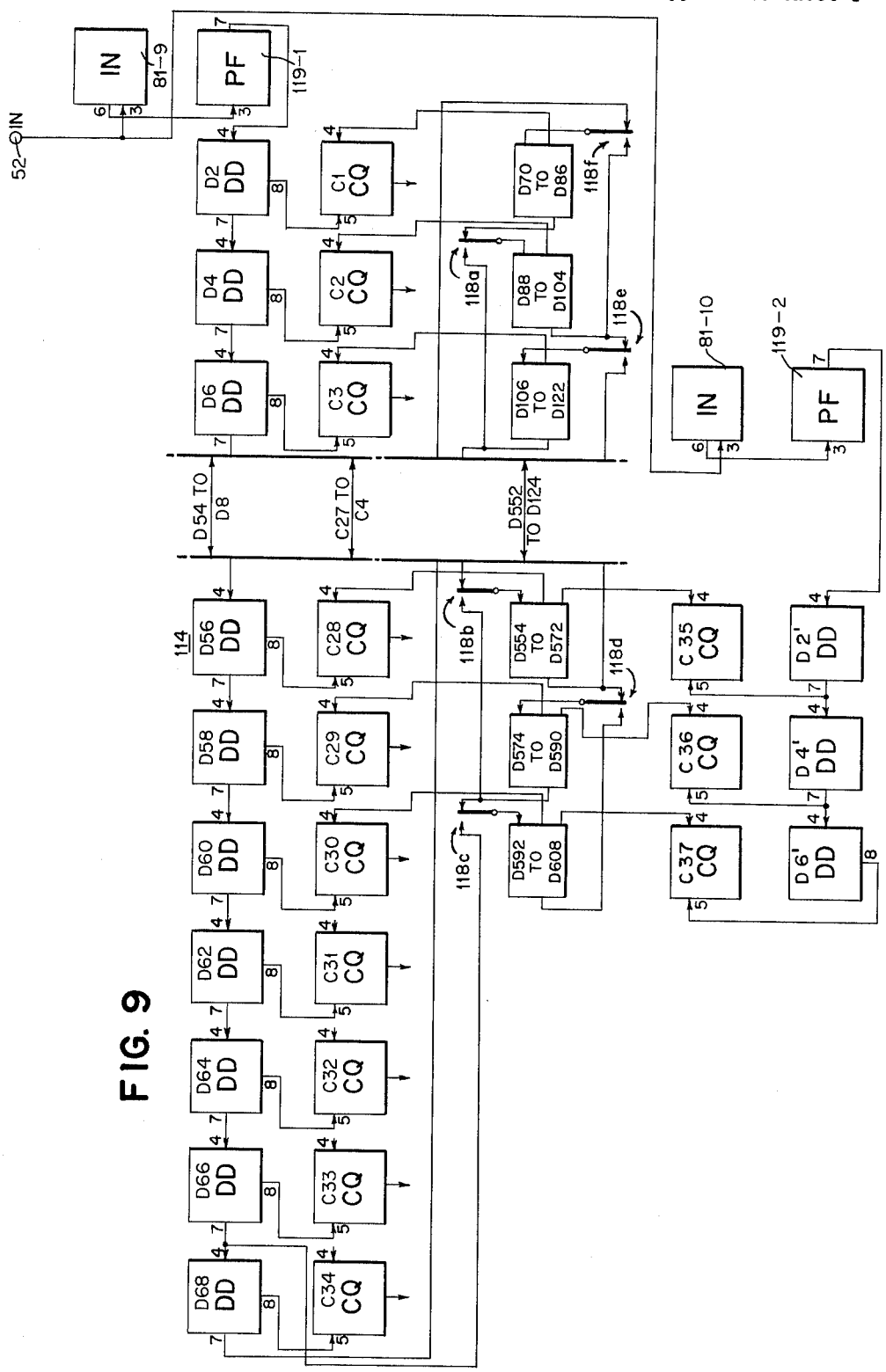
FIG. 9 is a block diagram, with repeated portions omitted for clarity, of the electronic delay line and comparison system forming a portion of the basic system of FIG. 1.
Figure 10A:
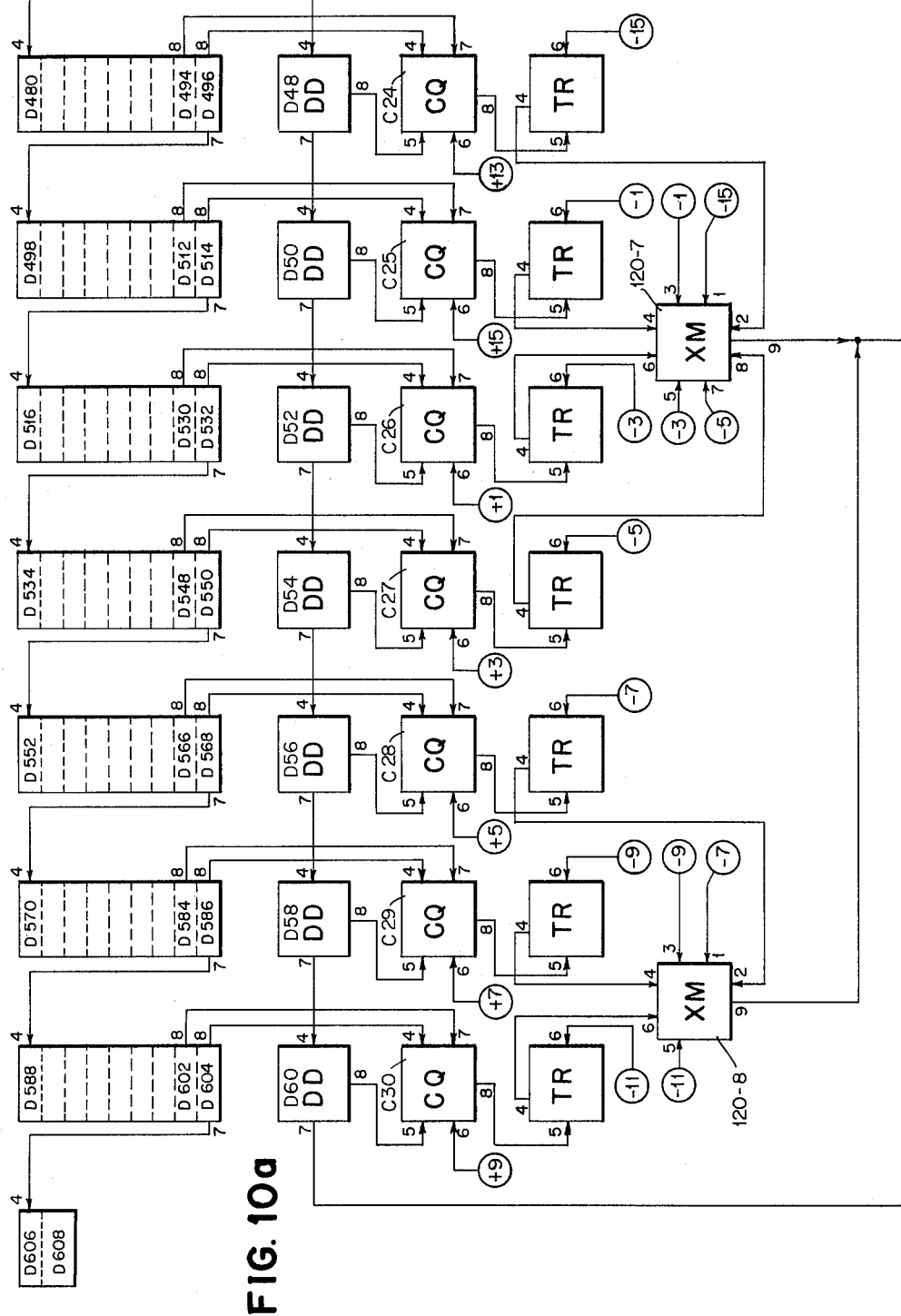
FIG. 10 (together with FIGS. 10a–10f) is a block diagram of the delay line and comparison system of FIG. 9 arranged for tetragraph operation, certain relay contacts being omitted for clarity.
Figure 10B:
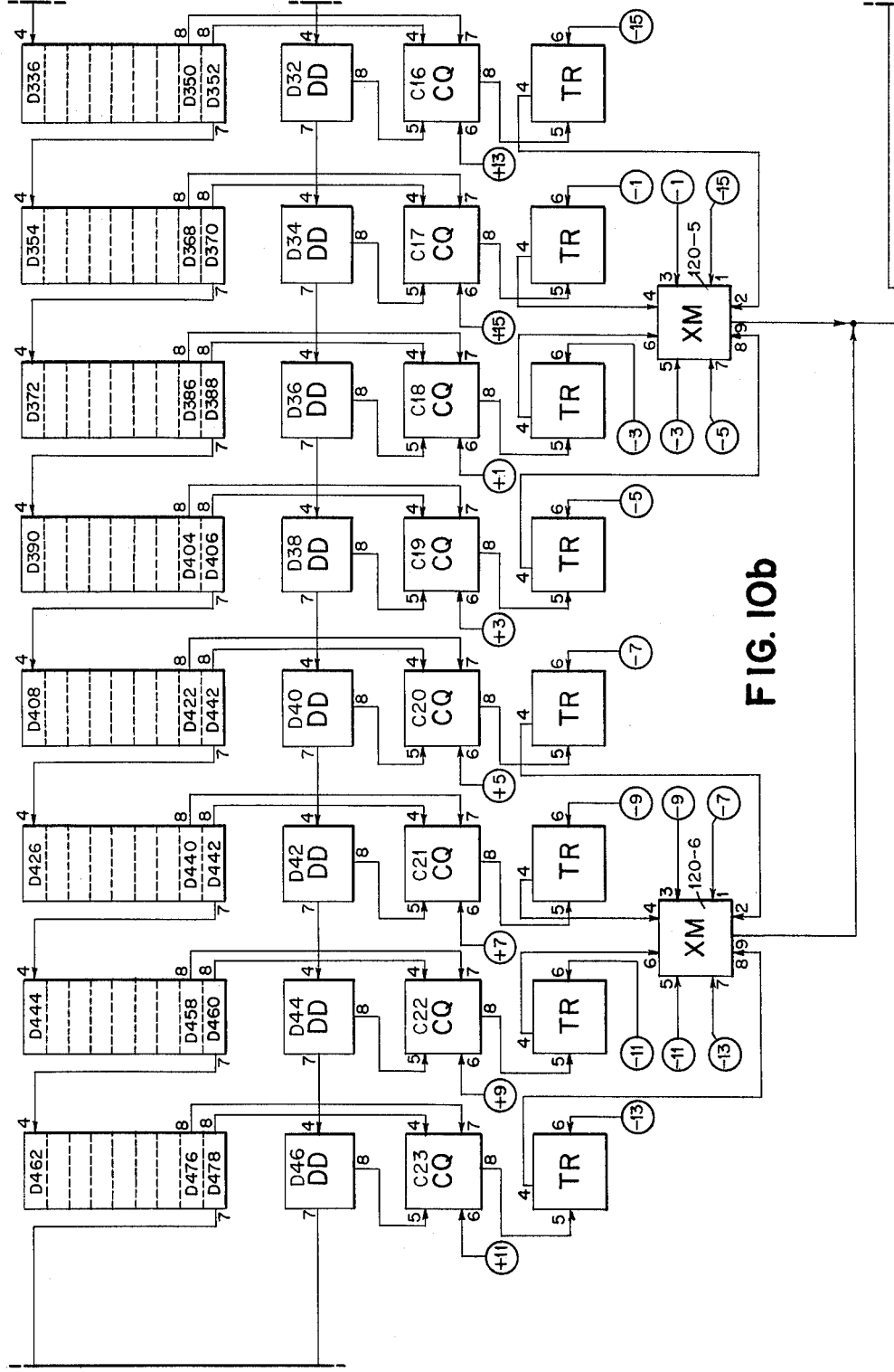
Figure 10E:
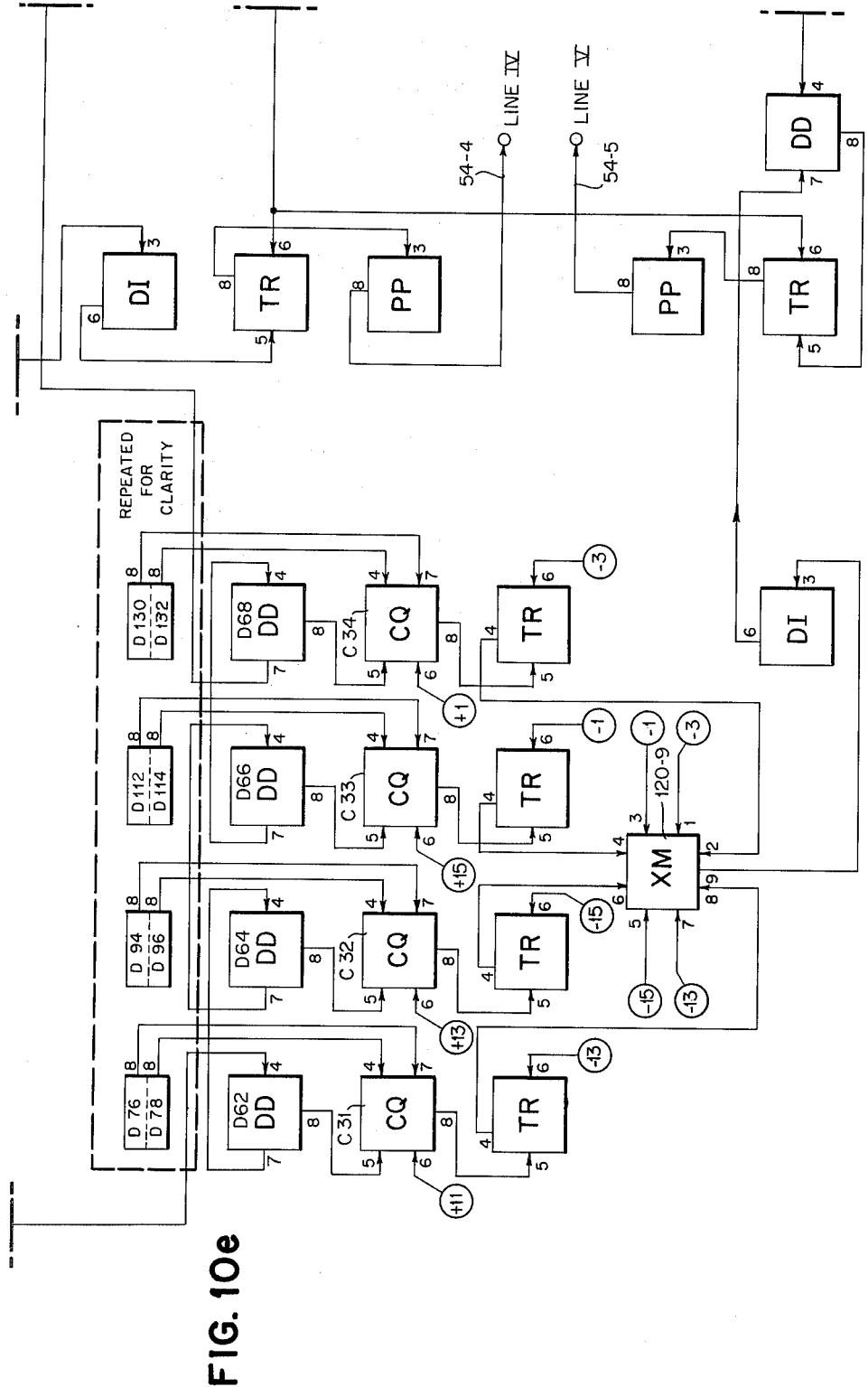

The arrangement of electronic delay line 114 and the associated comparators will be better understood by reference to the simplified representation of FIG. 9, in which a number of repeated portions have been omitted for clarity. In this figure, the 307 double delay units are respectively designated by even numbers from D2 through D608 and D2′ through D6′. One group of 37 delay units, designated D2 through D68 and D2′ through D6′, provides the first input to each of 37 comparators respectively designated C1 through C37. The remaining 270 delay units, designated D70 through D608, are divided into thirty groups of nine delay units each. These groups of delay units are connected together through relay contacts 118a through 118f, as shown. Selected delay units of these groups provide the second input for each of comparators C1 through C37.

Input signals at terminal 52 (also in FIGS. 2 and 6) are applied to delay unit D2 through an inverter unit 81–9 and a pulse-forming unit 119–1. The input signals are also applied through an inverter unit 81–10 and a pulse-forming unit 119–2 to delay unit D2′. Delay units D2′–D5′ are effectively in parallel with the first three delay units D2–D6 of the electronic delay line to eliminate the need for driving more than one comparator unit from a single delay unit. With the contacts of relay 118 positioned as shown in FIG. 9, that is, in their normal position, the system is arranged for tetragraphic operation. During such operation, the information traverses the 270 delay units D70 through D608 in the same direction as does the information going through the first 37 delay units comprising units D2 through D68 and D2′ through D6′. In this case, the information presented to each of comparators C1 through C37 for comparison is taken from delay units which are separated by multiples of sixteen bits.

When relay contacts 118a-f are in their picked or actuated positions, the system is adapted for pentagraphic operation. Under this condition, the information in the two portions of the delay line is traveling in opposite directions. In this case, the information presented to each comparator is taken from delay units which are separated by a multiple of twenty bits.

Reference is now made to FIG. 10, and 10a through 10f, of the drawings, which shows electronic delay line 114 and the associated comparison circuits set for tetragraphic operation with the relay contacts omitted. The outputs of comparator units C1, C2 and C3 are passed through trigger units 72–19, 72–20 and 72–21 to mixer unit 120–1. Likewise, the outputs of comparator units C4–C7 are supplied respectively to trigger units 72–22 through 72–25, the outputs of these trigger units being supplied to mixer unit 120–2. The outputs of mixer units 120–1 and 120–2 are combined and passed through a double inverter unit 121–1, a trigger unit 72–26 and a push-pull driver unit 117–2, to provide an output signal on output line 54–1, this line comprising one of the five lines of cable 54 (FIG. 1).

In a similar manner, the outputs of comparator units C8–C15 are combined in mixer units 120–3 and 120–4 to provide a signal output on line 54–2. The outputs of comparator units C16 through C23 are combined in mixer units 120–5 and 120–6, these mixer units supplying output line 54–3. Comparator units C24 through C30 have their outputs combined in mixer units 120–7 and 120–8, the resultant output signal being developed on output line 54–4. The outputs of comparator units C31–C34 are combined in mixer unit 120–9, and the outputs of comparator units C35 through C37 are combined in mixer unit 120–10. The outputs of these two mixer units are combined to provide the output signal appearing on output line 54–5. Even A synchronizing signals (occurring at 0.5, 2.5, 4.5 and 6.5 times), applied from a suitable source (not shown) to a terminal 122, are supplied through an inverter unit 81–11 to trigger units 72–26 and 72–27 associated respectively with output lines 54–1 and 54–2. Similar synchronizing signals are supplied through an inverter unit 81–12 to the corresponding trigger units associated respectively with output lines 54–3, 54–4 and 54–5. The output of delay unit D240 is supplied through a push-pull driver unit 117–3 to a tap output terminal 123.

Reference is now made to FIG. 11, and FIGS. 11a through 11d of the drawings, which shows electronic delay line 114 and the associated comparison circuits set for pentagraphic operation with the relay contacts omitted. In this case, the outputs of comparator units C1–C7 are combined in mixer units 120–1 and 120–2 to provide an output signal on output line 54–1. In a similar manner, the outputs of comparator units C8 through C15, as mixed in mixer units 120–3 and 120–4, serve to furnish an output signal on output line 54–2. Likewise, comparator units C16–C23 provide signals which, when combined in mixer units 120–5 and 120–6, appear on output line 54–3. The output signals on output line 54–4 are developed from the outputs of comparator units C24–C30, as combined in mixer units 120–7 and 120–8. It will be recalled that only 30 comparator units are utilized during pentagraphic operation. Thus units C31–C37 are not employed and hence do not show in FIG. 11. During pentagraphic operation, all the output signals appear on only four output lines. The fifth line, line 54–5, is connected to a source of negative voltage through switch contacts 124, as shown. The output of delay unit D260 is supplied through a push-pull driver unit 117–4 to a tap output terminal 125.

The grouping of the outputs of the comparators, as described above in connection with FIGS. 10 and 11, is an important feature of the present invention. It enables the outputs to be transmitted over five lines instead of the 37 lines which otherwise would be required. Five lines are required because, during tetragraphic operation, five different comparison circuits may detect identical groups simultaneously. Only three identical groups may be detected simultaneously during pentagraphic operation, but four output lines are used to simplify switching.

In order that the outputs of delay units D2 through D608 and D2′ through D6′ of FIGS. 9, 10a through 10f and 11a through 11d may be compared, it is necessary that all these delay units are kept in synchronism. For the purpose of accomplishing this, there is provided a synchronizing driver circuit arrangement which is shown in block form in FIG. 12 of the drawings. Basic synchronizing pulses, eight of which occur in each character time, are developed in a suitable source (not shown) and applied to a terminal 126. These positive-going sync pulses are inverted in an inverter unit 81–13 and supplied to a pulse forming unit 113–3. A potentiometer 127 associated with this unit serves to adjust the width of the reshaped pulses. The output of unit 119–3 is supplied to a number of inverter units 85–6 through 85–9. The output of each of these units serves to control a number of delay units. By way of example, only the circuit arrangements associated with the output of inverter unit 85–6 are shown and will now be described.

The output of this inverter unit supplies a number of cathode follower units 128–1 through 128–4. Each of these cathode follower units supplies positive-going synchronizing pulses, available at terminals 129–1 through 129–4, to the terminals designated 6 of a number of the delay units. These positive-going pulses are also supplied to inverter units 74–12 through 74–15, the negative-going synchronizing pulses comprising the outputs of these units being developed respectively at terminals 130–1 through 130–4. Each of these terminals is connected in turn to terminal 3 of a number of the delay units. It will be apparent, therefore, that all of the delay units comprising electronic delay line 114 are kept in synchronism, since they are supplied with suitable positive-going and negative-going synchronizing pulses having a basic timing depending only upon the basic synchronizing pulses applied to terminal 126.

Comparison circuits

Each of the 37 comparison circuits of FIGS. 10 and 11 compares the information presented to it from two sources, namely, two different delay units of electronic delay line 114, and allows an output signal to be presented at the associated output line whenever all of the information presented to the comparison circuit from one source matches or equals all the information presented from the second source during the time between two successive sampling pulses. Means are provided to insure that the occurrence of a garble signal will prevent an equal signal from being emitted from the comparison circuit at the next sample time.

Figure 13:
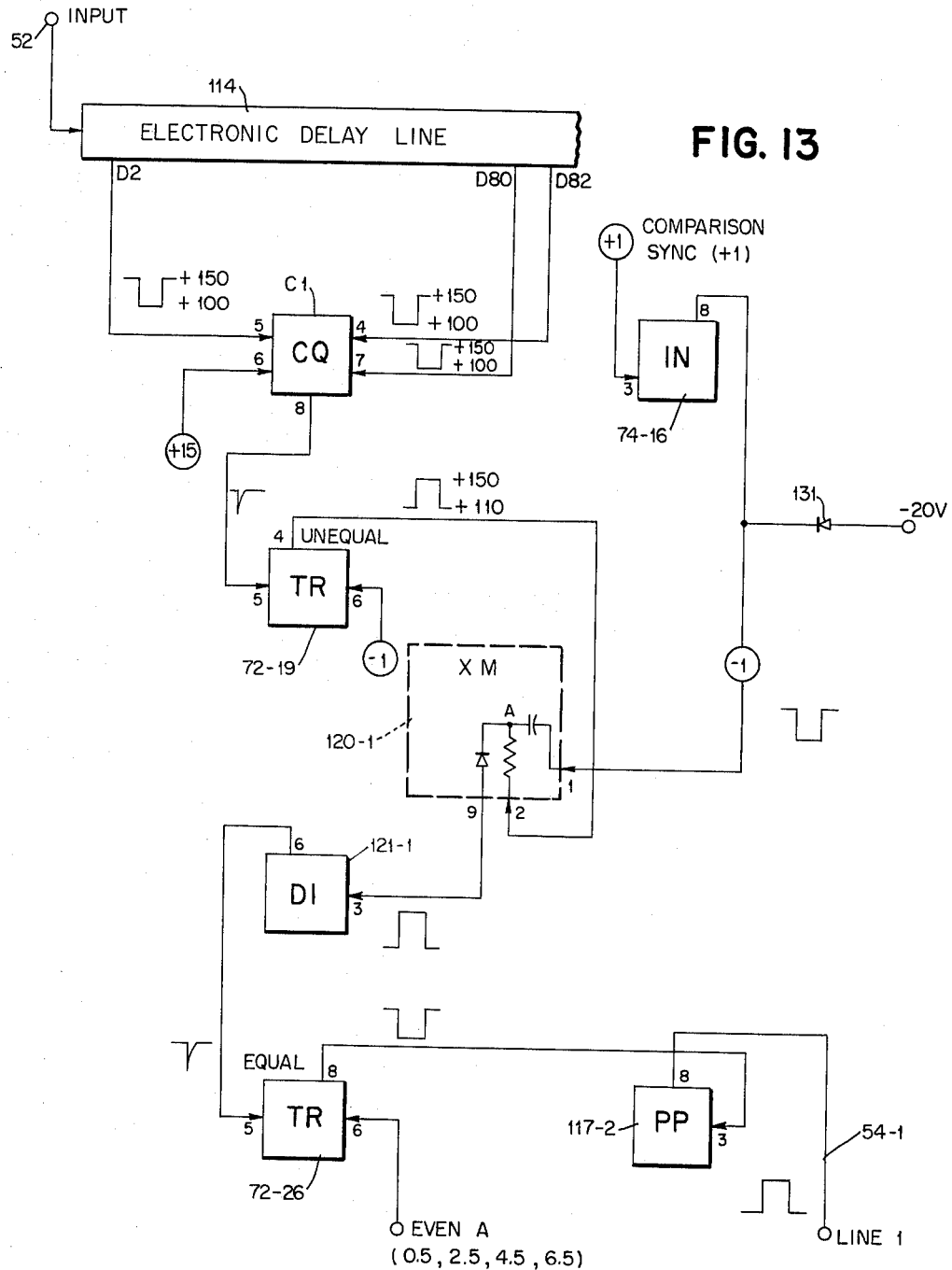
FIG. 13 is a block diagram of a portion of the comparison system of either of FIGS. 10 and 11.

By way of example, FIG. 13 shows the comparison circuit including comparator unit C1 of FIG. 10. This comparison circuit is typical of all the other comparison circuits of both FIGS. 10 and 11. In FIG. 13, as well as in FIGS. 10 and 11, the encircled reference numerals designate comparison sync signals which are developed in a manner which will be described later in connection with FIGS. 15a and 15b.

Figure 14:
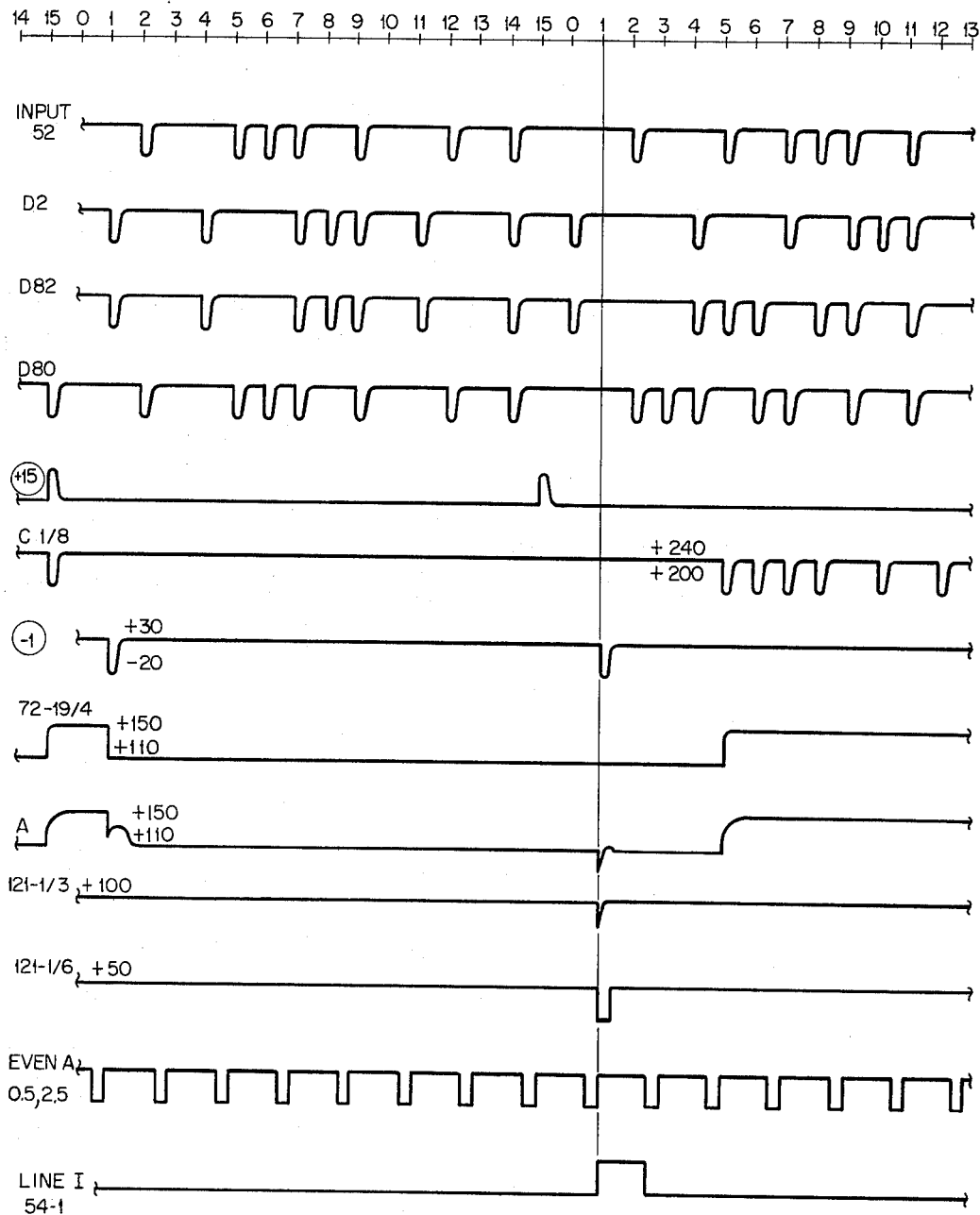
FIG. 14 is a timing chart illustrating the operation of the portion of the comparison system shown in FIG. 13.

Referring to FIG. 13, an understanding of which will be enhanced by reference to the timing chart of FIG. 14, there is shown comparator unit C1, input terminals 5 and 4 of which are connected respectively to the outputs of delay units D2 and D82 of electronic delay line 114. The bridge network of the comparator unit is such that its input triode is allowed to conduct whenever the two input signals are unequal. When this triode of comparator unit C1 conducts, a signal will be sent to unequal trigger unit 72–19, causing it to turn ON if it had been OFF. This trigger unit will remain ON until it is turned OFF again by the comparison sync pulse (−1) applied to its terminal 6.

The second triode of comparator unit C1 is used to detect garbles. This is accomplished by also supplying one set of the information signals being compared by the comparator unit to its terminal 7 two bits early. In the example shown, this is done by applying to this terminal the signals at the output of delay unit D80. Should a garble signal appear, the second triode will be enabled by the lowering of its cathode potential, so that the comparison sync signal (+15) applied to terminal 6 will be able to cause the triode to conduct and send a signal to turn ON unequal trigger unit 72–19. The comparison sync signal applied to terminal 6 is so timed as to reach comparator unit C1 at the time that the garble bit of the information group reaches terminal 7. This particular circuit arrangement is provided in order to prevent an equal signal from reaching the output line when both information sources contain a garble.

While unequal trigger unit 72–19 is OFF, it will enable positive mix switch unit 120–1. While this switch unit is enabled, a comparison sync signal (+1), which is first inverted by inverter unit 74–16 and clipped by a diode 131, will be able to pass through the switch unit and through inverter unit 121–1 to turn ON equal trigger unit 72–26. While ON, the latter trigger unit will send a signal through push-pull driver unit 117–2 to output line 54–1. Equal trigger unit 72–26 will be turned OFF by the following even A sync signal, applied at terminal 122 and inverted by inverter unit 81–11 (FIG. 10c).

Positive mix diode switch unit 120–1 has provisions for mixing signals from several sources. It is used, therefore, to mix the outputs of several comparator units as modified by the unequal trigger units and switching units respectively associated with them. The comparison sync signals (−1) presented to unequal trigger unit 72–19 and switching unit 120–1 are timed to occur one bit after the last bit of the information group has been compared by comparator unit C1. Presenting the same comparison sync signal to the unequal trigger unit 72–19 and to diode switch unit 120–1 does not cause difficulties, since the comparison sync signal will be terminated before trigger unit 74–19 responds to the signal from comparator unit C1.

Comparison sync generator

The comparison sync generator circuit, which is shown in block form with certain repeated portions omitted in FIG. 15a of the drawings, generates the comparison sync signals which are used by the comparison circuits of FIGS. 10 and 11. The comparison sync circuit comprises a delay line 132 made up of a single delay unit 133–1 and nine double delay units designated D610 through D628. Signals are stepped through delay line 132 by basic sync signals applied to the individual delay units. The input to delay line 132 is provided from three sources through inverter units 81–14 and 81–15. The input to inverter unit 81–14 comprises either IV sync pulses of V sync pulses (furnished by source 76 shown in FIG. 3) depending upon the position of a SPDT switch 134. The output of inverter unit 81–14 is supplied to the input of delay line 132.

For the purpose of providing inputs to inverter unit 81–15, a double positive coincidence diode unit 80–2 is utilized. One of the inputs to the first portion of this unit comprises the gating signal available at terminal 93 (also in FIG. 3), this gating signal being up during the third character time following each IV sync pulse. The second input to the first portion of unit 80–2 is a pulse signal occurring during 8-bit time of each character time which is applied to a terminal 135. The two inputs to the other portion of unit 80–2 comprise a gating signal which is up during the third character time following each V synchronizing pulse, this signal being present at terminal 94 (also in FIG. 3), and a pulse signal occurring during 4-bit time of each character time applied to terminal 136.

The outputs of each of the delay units of delay line 132 are passed through push-pull driver units respectively designated 117–4, 117–5 and 117–13, the outputs of these driver units respectively serving as the +1, +3 and +19 comparison synch signals. It will be understood that clarity. These several comparison synch signals are provided in a similar manner by means of delay units and driver units which have been omitted from FIG. 15a for clarity. These several comparison synch signals are passed through relay contacts (not shown) which are actuated simultaneously with the actuation of relay 118 (FIG. 9) and which serve to supply the appropriate comparison sync signals to the comparison circuits in a manner corresponding to the encircled designations appearing in FIGS. 10 and 11.

Figure 15B:
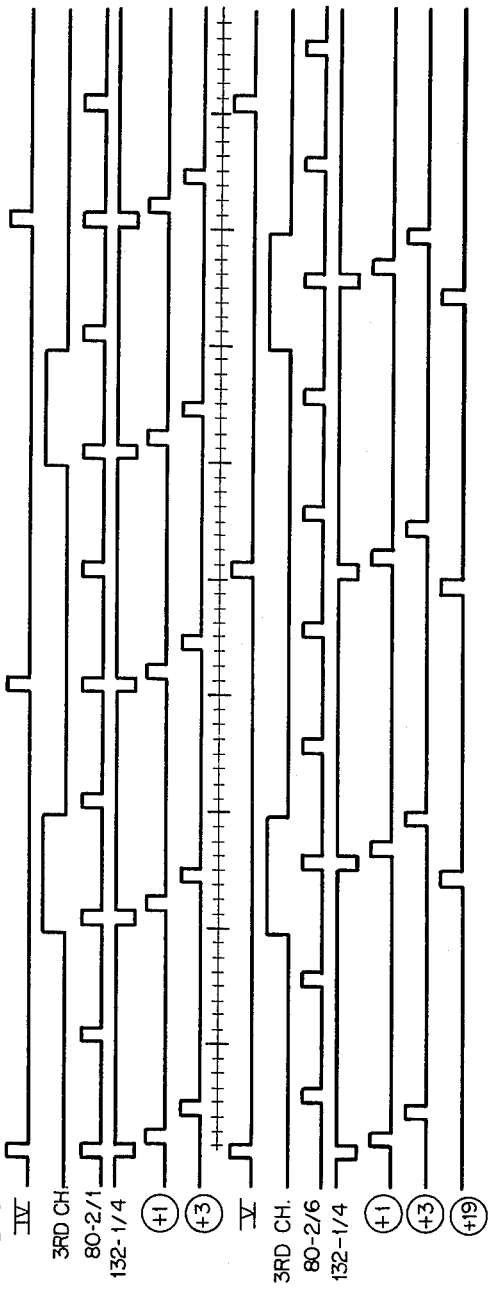

The operation of the comparison synch generator circuit of FIG. 15a will be better understood by reference to the timing chart of FIG. 15b, the upper portion of which corresponds with tetragraphic and the lower portion of which corresponds with pentagraphic operation. During tetragraphic operation, switch 134 is so actuated that a IV synch pulse is able to pass through inverter unit 81–14 and to enter delay line 132 in synchronism with the entry of a tetragraph into electronic delay line 114. Since the next following compressed tetragraph enters electronic delay line 114 sixteen bits later, it is necessary to enter another pulse into delay line 132 in synchronism with this second tetragraph. This pulse is obtained from coincidence unit 80–2, which is enabled by the signal which is present at terminal 93 during the third character time after the IV synchronizing pulse. While this coincidence unit is thus enabled, the 8-bit sync pulse applied to terminal 135 is able to pass through unit 80–2 and inverter unit 81–15 and to enter delay line 132 in synchronism with the above-mentioned second tetragraph.

The comparison synch signals are entered in the same way during pentagraphic operation, the only difference being in the pulses entering delay line 132. In this case, the V synchronizing pulse and the 4-bit synch pulse occurring during the third character time after the V synchronizing pulse are able to enter delay line 132. These two pulses are separated by twenty bit times, as required for pentagraphic operation.

The apparatus which has been described in this section of this specification receives information in serially coded form, this information comprising a relatively large number of compressed tetragraphs or pentagraphs. The input information is passed through an electronic delay line having associated with it a number of comparison circuits, the arrangement being such that every group of information items stored in the delay line may be compared with every other group. When an identity between any two groups is detected, an output signal is produced on one of five output lines. An important feature of this portion of the present invention is that a minimum amount of switching is required to adapt the apparatus for the comparison of tetragraphs or pentagraphs. A further feature is that the signals denoting identities are developed on only five output lines.

*Five line to binary conversion system*

The five line to binary conversion system 55 of FIG. 1 is shown in detail, in block form, in FIG. 16. This system counts the number of comparison output lines (FIGS. 10 and 11) that are signalled, that is, at +30 volts, at sampling time, converts this number into binary representation, and presents the resultant output over three signal lines corresponding respectively to values of one, two and four. When none of the comparison output lines is signalled, there will be no output from this conversion system.

The five comparison output lines 54 comprise the inputs to this system. These lines are supplied to an inverter unit 140 comprising respectively individual inverter units 74–17, 74–18 and 74–19. The output of inverter unit 140 is supplied to a "1 or more" OR unit 141, and to a "2 or more" converter unit 142. Input lines 54 are also supplied to a "3 or more" converter unit 143 and to a "5 only" AND unit 144. Conversion units 142 and 143 together comprise six separate individual inverter units, designated respectively 145–1 through 145–6. Each of converter units 142 and 143 consists essentially of a voltage divider in which a resistor forms one leg and five triodes form the other leg. The voltage at the output of the converter depends upon the number of conducting triodes in the leg containing the triodes. The only difference in the two converters is in the polarity of the signals presented to the triode.

Let it first be assumed that only one of input lines 54 is signalled. The inverted signal will be presented to "1 or more" OR unit 141, which allows a signal to be presented to a "1 and not more" AND unit 79–4. Since the input to the "2 or more" converter unit 142 is only one signal in this case, it will not provide a signal to the "1 and not more" AND unit 79–4 which would serve to stop the signals supplied to the latter unit from "1 or more" OR unit 141. Thus the latter signal is permitted to pass through the "1 and not more" AND unit 79–4 and to reach the "1" sample unit 147, which comprises coincidence units 80–3 and 80–4. When the "1" sample unit 147 is enabled by the sample driver in a manner which will be described later, the signal is permitted to reach "1" OR unit 148 comprising inverter units 81–17 and 81–18 and to pass through a delay unit 133–2 and a push-pull driver unit 107–2, thus in this case causing an output signal to appear on output line 56–1. Since this is the "1" output line, the information now represented on output lines 56 indicates that only one of input lines 54 is signalled.

When two of the input lines 54 are signalled simultaneously, the output of "2 or more" converter unit 142 will send a signal to the "1 and not more" AND unit 79–4 to indicate that the count is in excess of one and that, accordingly, the signals from the "1 or more" OR unit 141 would be prevented from passing. This signal, which is limited to +30 volts by means of a diode unit 149–1 to prevent overdriving the following circuits, is also presented through an inverter unit 79–5 to a "2 or 3" AND unit 79–6. The latter unit will allow this signal to reach "2" sample unit 80–5, since the latter unit is not signalled to stop the "2" signal by a signal supplied through an inverter unit 78–18 from the "4 or more" inverter unit 81–16. The "2" sample unit in turn will allow this signal to reach output line 56–2 through an inverter unit 81–19 and a driver unit 107–3 when the sample unit is enabled by the sample driver in a manner which will be described later. Thus the circuit arrangement which has just been described will be able to place a signal on the "2" output line, designated 56–2 at sample time whenever two or three of input lines 54 are simultaneously signalled.

When three of input lines 54 are signalled simultaneously, a signal will be placed on output line 56–2 in the manner just described for the condition of two input lines signalled, and a signal will be placed on output line 56–1 in the following manner. The output of "3 or more" converter unit 143 is limited by a diode unit 149–2 to approximately +45 volts when three of input lines 54 are signalled. This will cause the "3 or more" inverter unit 85–10 to be cut off, but is insufficient to cut off "4 or more" inverter unit 81–16. While the "3 or more" inverter unit 85–10 is cut off, it will send a signal through another inverter unit 78–19 to the "3" AND unit 79–7, which in turn will allow the signal from "3 or more" inverter unit 85–10 to pass through and reach "1" sampling unit 147 because the "4 or more" inverter unit 81–16 does not indicate that the count is four or more in this case. At sampling time the sample driver will enable the sample units and the signal from inverter unit 85–10 will be able to pass through "1" sample unit 147 and "1" OR unit 148 to reach delay unit 133–2 and driver unit 107–2 and thus to appear on output line 56–1 after a 1-bit delay. Thus when three of input lines 54 are signalled simultaneously, a signal will be placed on output lines 56–1 and 56–2, these lines comprising the "1" and "2" lines for the output of the system in binary notation.

If four of input lines 54 are signalled simultaneously, a signal will be placed on output line 56–4 and suppressed on the other output lines by the following circuit arrangement. The output voltage of the "3 or more" converter unit 143 will drop to approximately zero volts when four of input lines 54 are signalled. This will cut off both "3 or more" inverter unit 85–10 and "4 or more" inverter unit 81–16. The signal which results when "4 or more" inverter unit 81–16 is cut off is sent to the "3" AND unit 79–7 to prevent any signal from getting through this unit, and to the "2 or 3" AND unit 79–6 to prevent any signal from getting through this unit. This signal is also presented to a "4" sample unit 80–4, from which it will be allowed to reach output line 56–4 through an inverter unit 81–20 and a driver unit 107–4 when the sampling unit is enabled by the sample driver. Thus the only signal to reach the output lines at sampling time, while four input lines are signalled, is the signal on output line 56–4.

When all five of lines 54 are signalled simultaneously, output line 56–4 will be signalled by the circuit arrangement just described, and output line 56–1 will be signalled by a signal from the "5 only" AND unit 144, comprising three inverter units 81–21, 81–22 and 81–23 and three cathode follower units 111–2, 111–3 and 111–4. Unit 144 sends a signal through an inverter unit 74–20 to the "1" sample unit 147 while all five input lines are signalled. At sampling time the sample driver will enable the sample units and a signal will be able to reach output line 56–4 through push-pull driver unit 107–4, and a signal will be able to reach output line 56–1 through push-pull driver unit 107–2 after a 1-bit delay in delay unit 133–2.

Sample driver unit 150 controls the operation of the "1," "2" and "4" sample units respectively designated 147, 80–5 and 80–6. Even-bit synchronizing signals are supplied from a suitable source (not shown) to a terminal 151, from which they pass through a pulse forming unit 119–3 and a push-pull inverting and driving unit 107–5. The other input to sample driver unit 150 comprises control pulses supplied to a terminal 152 and passed through an inverter unit 81–24 and push-pull driver unit 107–6. When input pulses are present simultaneously on both of input terminals 151 and 152, sample driver unit 150 enables the "1," "2" and "4" sample units, so that any signal presented to them at this time will be able to pass through.

The apparatus which has been described in this section of this specification receives information in the form of a signal voltage on one or more of five input lines. The input information is passed through a number of converter, AND and OR circuits and an output is provided on three output lines in binary notation, that is, signals present on the three lines correspond respectively to the values of one, two and four. Thus the output information furnished has a value corresponding to a count of the number of input lines which are signalled. The provision of such a five line to binary conversion system is an important feature of the present invention.

BASIC PROGRAMS

After the material has been converted to serial form and compressed by the number conversion and code compression system of FIG. 2, it is in a form that will allow comparison to be made between groups, except there are gaps in the serial representation as a result of the compression process. These gaps are filled, in accordance with the present invention, by so programming the compressed material that a part of the stream is delayed and collated with the remaining groups in such a way that a solid stream of material is produced. The manner in which this is accomplished will now be described separately for tetragraphs and pentagraphs.

Tetragraph programming

The basic programming for tetragraphs is shown in FIG. 17. As shown in this figure, output terminal 52 of conversion and compression system 50 is connected to the position 1 input of a two-position switch S2, and to the position 1 input of a four-position switch S3. The output of switch S2 is supplied to a 960-bit delay unit 155, the output of which serves as input 1 of a mixer unit 156 associated with electronic delay line 114. The output of switch S3 provides input 2 of mixer unit 156. Switches S2 and S3, which are preferably of an electronic type, are controlled by programming signals applied respectively to terminals 157 and 158 from a suitable source, not shown.

Output terminal 52 of conversion and compression system 50 is connected through a 16-bit delay unit 159 to the position 2 input of switch S3. Tap output 123, which immediately follows delay unit D240 of electronic delay line 114, is connected to the position 2 input of switch S2 and to the position 3 input of switch S3. The position 4 input of switch S3 is connected to an OFF terminal 160. As previously described in connection with FIGS. 9 and 10, electronic delay line 114 with the associated comparison circuits comprises delay line and comparison system 53. The output of this system is supplied on lines 54 to five line to binary output conversion system 55, the output of which in turn is developed on lines 56.

The operation of the arrangement of FIG. 17 will be better understood by reference to the flow chart of FIG. 18. As shown in this chart, the first batch of material to be analyzed comprises 75 groups which are numbered from 1 to 75 in the order of their appearance at the output of conversion and compression system 50. The second batch of material comprises a series of groups which are provided with alphabetic designations. For rows 1 and 2 of the chart, switch S2 is in its position 1 and switch 3 is in its position 4. As shown in row 1, the first group of the first batch of material has passed through 960-bit delay unit 155 and is about to enter electronic delay line 114 through input 1 of mixer unit 156. In row 2, the progression has continued until the first group is at tap 123. At this point, switch S3 is actuated, so that tap 123 is connected to input 2 of mixer unit 156. As illustrated by row 3, this causes group 1 to be collated, that is, inserted in the progression between groups 8 and 9. This process continues, as shown by row 4, until the first seven groups have been collated in a similar manner. At this time, there is a blank (no coding) at tap 123. Switch S2 is now actuated so that tap 123 is connected to the input of 960-bit delay unit 155. Row 5 shows electronic delay line 114 filled to tap 123. Switch S3 is now actuated to connect the output of 16-bit delay unit 159 to input 2 of mixer unit 156, with the result that group 45 from 16-bit delay unit 159 is collated between groups 15 and 16. This condition is illustrated by row 6. Collation in this manner continues until electronic delay line 114 is filled, as shown by row 7, at which time the count of identities may begin.

Row 8 shows the condition in which group 75, the last group of the first batch of material, is about to leave converter and compression system 50. At this time, switch S3 is actuated to its position 1, so that 16-bit delay unit 159 is by-passed and group 75 is permitted to pass directly into electronic delay line 114 through input 2 of mixer unit 156. This condition is illustrated by row 9. Switch S3 is now shifted to its position 4 or OFF position, so that no further material is supplied to input 2 of mixer unit 156. One group interval later, as shown by row 10, the first or A group of the second batch of material is ready to emerge from conversion and compression system 50. Switch S2 is now shifted to its position 1, so that the input of 960-bit delay unit 155 is connected to the output of conversion and compression system 50. As illustrated in row 11, the new batch of material begins to flow through delay unit 155, and the count of the first batch of material continues. This count stops 1200 bits from the time it started. In any event, the count must be completed before the new batch of material enters electronic delay line 114.

It will be recalled that comparisons are made in 37 comparison units. Since every tetragraph will appear at both inputs to each comparison unit as it moves down the electronic delay line, each comparison unit will make 74 separate comparisons. The comparison unit actually checks for unequals, an output or equal pulse being emitted on one of the five output lines 54 if no unequal pulses occur within the span of the group that is being checked. It is to be noted that there is some leeway in the time of starting the count since the solid stream of material through the electronic delay line will continue beyond the time allowed for a complete comparison to be made. The count of equal comparisons is taken for a time equivalent to the length of the compressed span of material, this span being one-half the length of the original material.

Pentagraph programming

The basic programming arrangement for pentagraphs is shown in FIG. 19. In this case, the material coming from conversion and compression system 50 is delayed in an 8-bit delay unit 161 in order to produce the correct relationship of the pentagraphs to the V sync pulses. This delay unit was unnecessary in the basic tetragraph programming arrangement of FIG. 17, since in that case the delays in conversion were just sufficient to bring the output into correct relationship with the IV sync pulses. For pentagraph operation, 16-bit delay unit 159 (FIG. 17) is replaced by a 20-bit delay unit 162. As shown in FIG. 19, a garble generator 163 has its output connected to the position 1 input of switch S3. Tap 125 of electronic delay line 114 is taken immediately after delay unit D260, rather than after 240 bits of delay as in the tetragraphic arrangement of FIG. 17. Otherwise the arrangement of FIG. 19 is substantially the same as that described in connection with FIG. 17.

The operation of FIG. 19 will be better understood by reference to the flow chart of FIG. 20. As before, the 60 groups comprising the first group of material are numbered from 1 to 60, and the groups comprising the second batch of material are designated alphabetically. As illustrated by row 1, the first group of the first batch of material, designated group 1, is about to enter electronic delay line 114 through input 1 of mixer unit 156. In row 2, the material has progressed until group 1 is at tap 125. At this time, switch S3 is actuated to its position 3 so that tap 125 is connected to input 2 of mixer unit 156. This causes group 1 to be collated between groups 7 and 8, as illustrated by row 3. Collation continues until the first six groups have been collated and a blank (no coding) is at tap 125, as shown by row 4. Switch S2 is now actuated to its position 2, thus connecting tap 125 to the input of 960-bit delay unit 155.

One group interval later, electronic delay line 114 is filled to tap 125, as shown in row 5. At this point, switch S3 is shifted to its position 2, so that the output of 20-bit delay unit 162 is supplied to input 2 of mixer unit 156. As a result, group 37 from 20-bit delay unit 162 is collated between groups 13 and 14, as illustrated by row 6. Similar collation of successive groups from 20-bit delay unit 162 continues until electronic delay line 114 is filled and the count of identities may begin. This condition is illustrated by row 7. As shown in row 8, the last group of the first batch, designated 60, is in the first position of electronic delay line 114. Group A, the first group of the second batch of material, is available at the output of conversion and compression system 50. At this time, switch S3 is shifted to its position 1, so that a garble group from generator 163 may be introduced into the first position of electronic delay line 114. At the same time, switch S2 is shifted to its position 1, so that the material at the output of conversion and compression system 50 may be supplied to the input of 960-bit delay unit 155. Row 9 shows the condition with the garble group inserted in the first position of electronic delay line 114. Switch S3 is now turned to its position 4 or OFF position, so that no further material is supplied to electronic delay line 114 through input 2 of mixer unit 156. As shown by row 10, the new batch of material has begun to enter 960-bit delay unit 155. The count of identities may stop 1220 bits from the time it started, and in any event must be completed before the second batch of material enters electronic delay line 114.

As in the case of tetragraphs, there is some leeway as to the starting of the count, the count continuing for a time equal to a compressed span. The number of the comparison units necessary to take care of the 60 comparisons is 30. The seven additional units required for tetragraph material are associated with the fifth line of output lines 54. This line is not used when comparing pentagraphs, so that the seven additional units have no effect in this case.

THE BASIC CIRCUIT COMPONENTS

For convenience, the basic circuit components, some of which are used in a number of different places in the system as a whole, are shown individually in FIGS. 21–45. Table III indicates the reference numeral assigned to each of these basic circuit components and the figure or figures in which each of them is employed. Reference to this table, taken with the brief description of the basic components immediately following, will provide the information necessary for a complete understanding of the previous figures of the drawings.

*Table III*

[Basic circuit components]

Figure 12:
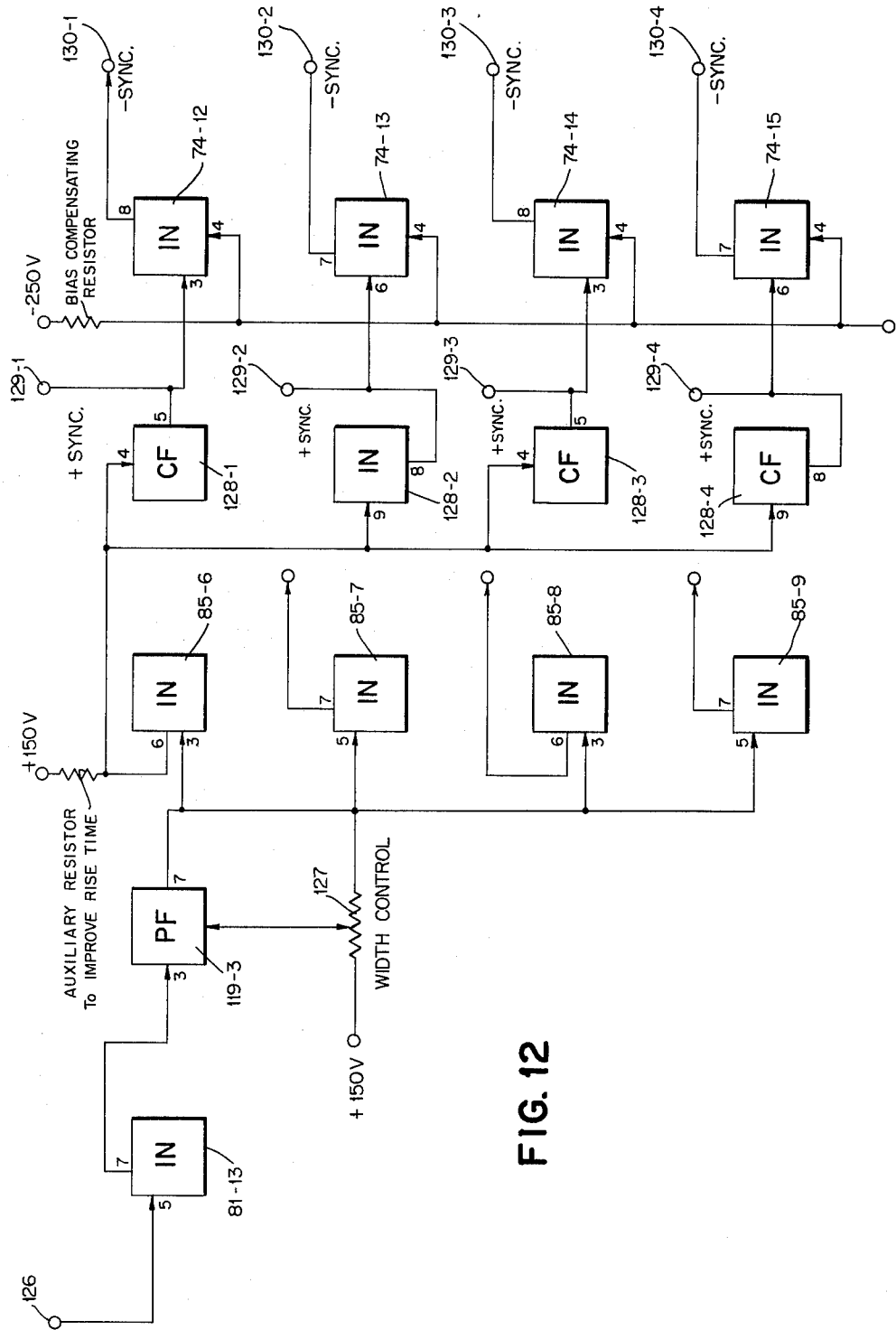
FIG. 12 is a block diagram of the synchronizing driver circuits associated with the delay line of FIG. 9.

| Figure No. | Reference numeral | Used In— |
|---|---|---|
| 21 | 72 | Figs. 3–5, 10, 11, 13. |
| 22 | 74 | Figs. 3–5, 12, 13, 16. |
| 23 | 77 | Fig. 3. |
| 24 | 78 | Figs. 3–6, 16. |
| 25 | 79 | Figs. 3, 4, 16. |
| 26 | 80 | Figs. 3, 15, 16. |
| 27 | 81 | Figs. 3–6, 9–12, 15, 16. |
| 28 | 85 | Figs. 3, 12, 16. |
| 29 | 101 | Figs. 4 and 6. |
| 30 | 107 | Figs. 5 and 16. |
| 31 | 64 | Fig. 5. |
| 32 | 111 | Figs. 5 and 16. |
| 33 | 112 | Fig. 5. |
| 34 | 113 | Figs. 5 and 6. |
| 35 | 117 | Figs. 6, 10, 11, 13, 15. |
| 36 | 119 | Figs. 9–12, 16. |
| 37 | C | Figs. 9–11, 13. |
| 38 | D | Figs. 9–11, 15. |
| 39 | 120 | Figs. 10, 11, 13. |
| 40 | 121 | Figs. 10, 11, 13. |
| 41 | 128 | Fig. 12. |
| 42 | 133 | Figs. 15 and 16. |
| 43 | 141 | Fig. 16. |
| 44 | 145 | Fig. 16. |
| 45 | 149 | Fig. 16. |

Figure 21:
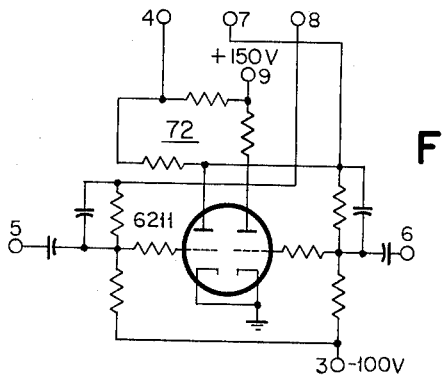
Figure 22:
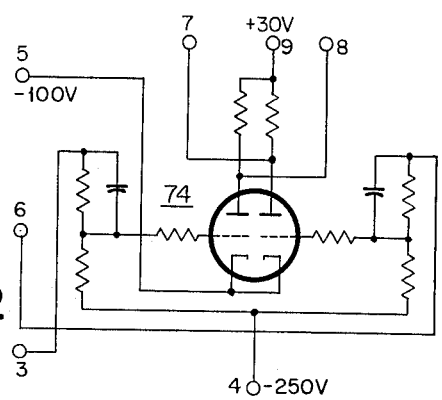

The trigger unit 72 of FIG. 21 is a general-purpose medium-speed trigger circuit which is adapted for operating speeds up to 200 kilocycles per second. The inputs (terminals 5 and 6) may be tied together for binary operation. There are two full outputs (terminals 7 and 8) and one tap output appearing at terminal 4. Inverter unit 74 of FIG. 22 is a dual low-to-low inverter with a compensated divider network associated with each half. The cathodes of the two inverters are internally commoned.

Figure 23:
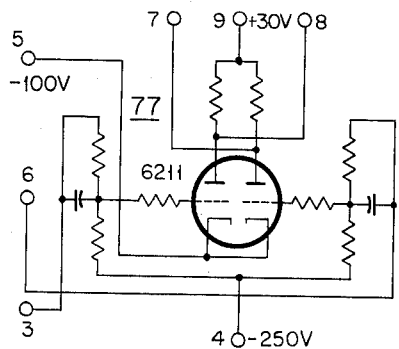
Figure 24:
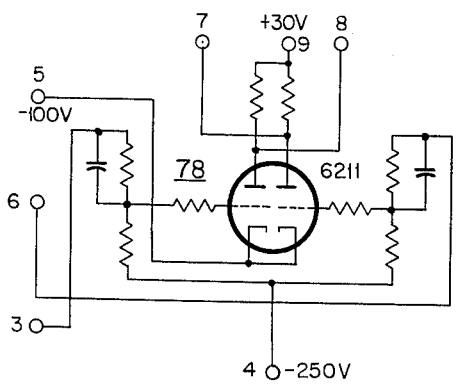
Figure 25:
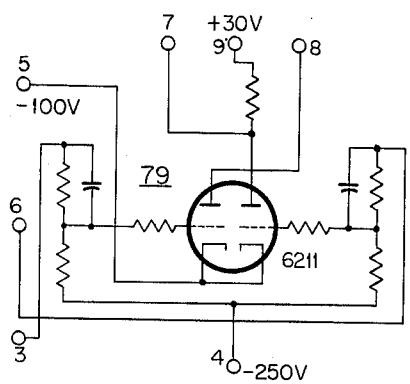
Figure 26:
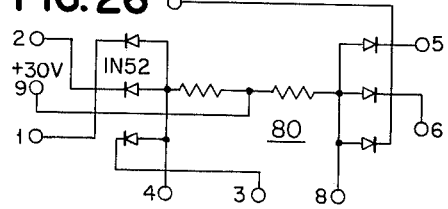

Inverter unit 77 of FIG. 23 is a dual inverter intended to be used in conjunction with cathode followers to provide a push-pull circuit. Inverter unit 78 of FIG. 24 contains two high-to-low inverters each having a compensated divider input circuit. In inverter unit 79 of FIG. 25, no plate load resistor is provided for the left triode section, and the right triode section comprises a low-to-low inverter. Positive coincidence diode unit 80 of FIG. 26 contains two triple coincidence diode switches. When a positive signal is placed on inputs 1, 2 and 3 or inputs 5, 6 or 7 simultaneously, an output will be obtained at terminals 4 and 8, respectively. This unit may also be used to mix negative signals presented to inputs 1, 2 or 3 or inputs 5, 6 or 7. The outputs of the mixed signals in this case will also appear respectively at terminals 4 and 8.

Figure 27:
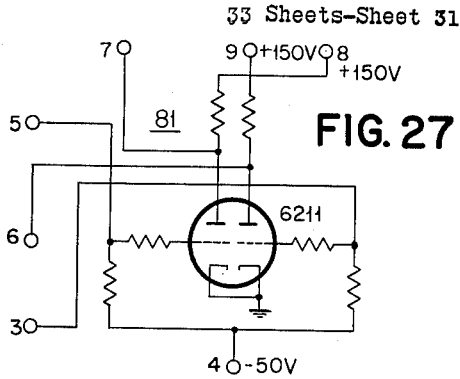
Figure 28:
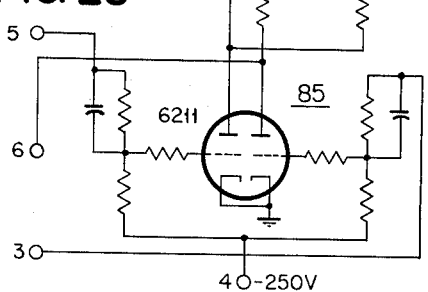
Figure 29:
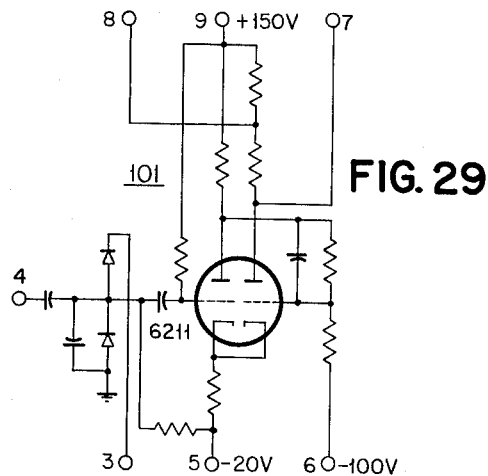

Inverter unit 81 of FIG. 27 comprises two independent low-to-high inverters. Inverter unit 85 of FIG. 28 is of the dual high-to-high type, and is especially adapted for use where a high-speed inverter is required. Delay unit 101 of FIG. 29 is of the single storage type. This unit will delay input pulses applied to terminal 4 until the next synchronizing pulse appears at terminal 3. The resultant pulse is then shaped and developed at output terminal 7. The trailing edge of the input pulse must either coincide with or occur slightly after the trailing edge of the synchronizing pulse.

Figure 30:
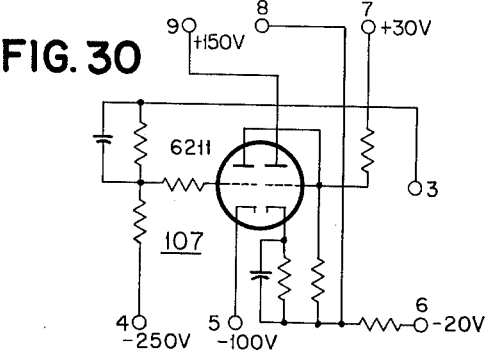
Figure 31:
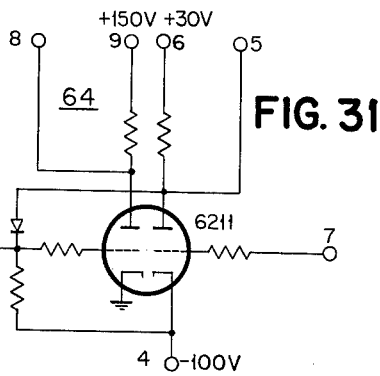

Push-pull unit 107 of FIG. 30 contains a twin triode with one of the triodes connected as a cathode follower and the other triode connected in a plate follower circuit. This combination is used to obtain the desired features of both the cathode and plate follower circuits and to minimize their undesirable features. The output from terminal 8 will be the inverted form of the input signal applied to terminal 3, and will operate between the voltage levels of −30 and +30 volts. This unit is able to deliver much more power than the conventional inverter. In pulse-forming unit 64 of FIG. 31, positive-going pulses applied to input terminal 3 are formed into pulses of a duration determined by the RC network externally placed between terminals 7 and 8. These pulses will be emitted from terminal 5.

Figure 32:
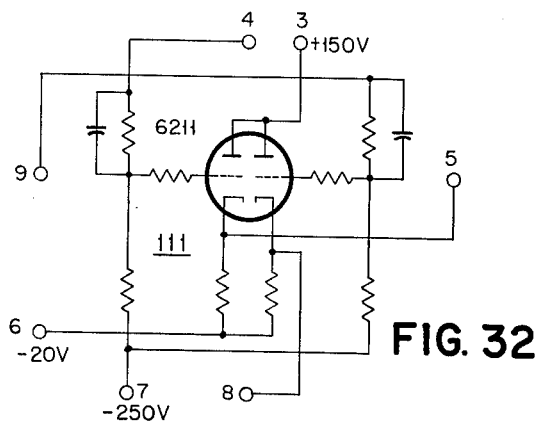

Cathode follower unit 11 of FIG. 32 is a dual device with a common plate connection but individual input and output connections. The input is a high-level (+150 to +50 volt), and the output is a low-level (+30 to −20 volt) signal. Twin triode unit 112 of FIG. 33 comprises a dual tube having commoned cathodes, separate input terminals 5 and 8 associated with the grids, and separate output terminals 3 and 6 connected to the plates. In inverter unit 113 of FIG. 34, two inverters are provided having their output terminals 7 and 8 clamped at −20 volts by crystal diodes. The plate load resistors are external to this unit.

Push-pull unit 117 of FIG. 35 operates in a manner similar to that of push-pull unit 107 of FIG. 30, but is capable of driving heavier loads without altering the output shape. This additional capacity is due to the use of crystal diodes. The crystal diode tied between terminal 8 and the plate of the plate follower isolates this plate from the load when the plate voltage starts to rise as the result of a negative signal being applied to input terminal 3. Thus the grid voltage of the cathode follower will rise faster because the voltage of the load applied to terminal 8 will not have to be raised. When the cathode follower starts to conduct as a result of the higher voltage on its grid, the cathode follower will pull the output signal line up. The crystal diode associated with terminal 7 limits the voltage at the plate of the plate follower to +30 volts, the potential at terminal 7. The voltage at this plate would otherwise rise higher due to the action of the cathode follower.

Pulse former unit 119 of FIG. 36 has a capacitive input at terminal 3. The output pulse developed at terminal 7 may be varied in length to 1, 2 or 3 microseconds by connecting terminal 6 to terminal 9, terminal 8 or terminal 7, respectively. A 100-volt input pulse is required, and a 100-volt output pulse will be emitted at terminal 7. The capacitor unit designated C and shown in FIG. 37 has a left-hand triode which will cause a signal to be emitted from terminal 8 when the signals presented to terminals 4 and 5 are not the same. The right-hand triode will emit a signal from terminal 8 when a negative signal is presented to terminal 7 and a positive signal is presented to terminal 6.

Delay unit D of FIG. 38 delays pulses presented to input terminal 4 until the second synchronizing pulse is applied at terminal 6. A 100-volt negative-going pulse is required as an input. It is necessary that the trailing edge of the input pulse occurs simultaneously with or after the trailing edge of the negative-going synchronizing pulse. The synchronizing signal applied to terminal 3 is a negative-going (+30 to 0 volts) pulse and the synchronizing signal applied to terminal 6 is a positive-going (−45 to +0 volts) pulse. The circuit components are selected for optimum performance at a synchronizing pulse repetition rate of 120 kilopulses per second with each pulse approximately two microseconds wide. Normally the synchronizing pulses applied to terminal 6 are derived by inverting the synchronizing pulses presented to terminal 3.

Diode mixer unit 120 of FIG. 29 operates as a quadruple negative coincidence switch. If negative pulses are presented to the input terminals 1, 3, 5 and 7 while the associated terminals 2, 4, 6 and 8 are at ground potential, the input pulse will be transmitted through the capacitor and will appear at output terminal 9. If terminals 2, 4, 6 and 8 are at a high enough positive potential, the negative input signals will be prevented from appearing at the output.

Figure 40:
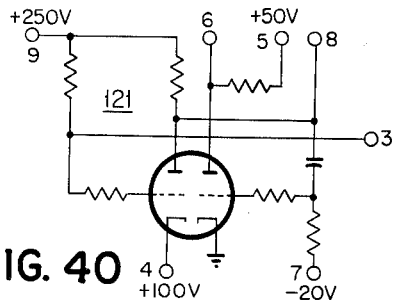

In inverter unit 121 of FIG. 40, the left-hand triode is normally conducting. A small (20-volt) negative-going pulse presented to terminal 3 will turn OFF the left triode. In turning OFF, the voltage at the plate will rise, whereby raising the grid of the right-hand triode and causing this tube to conduct. The output appearing at terminal 7 will be an amplified negative-going pulse (+50 to +10 volts).

Figure 41:
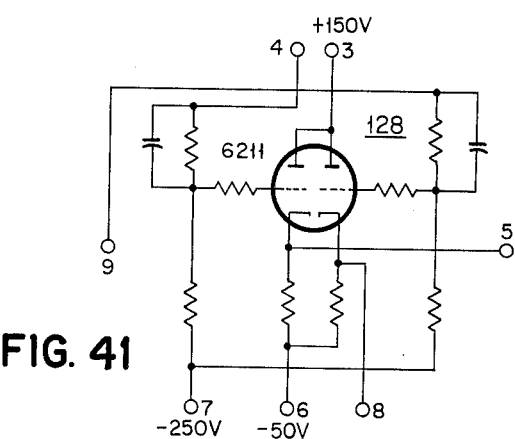
Figure 42:
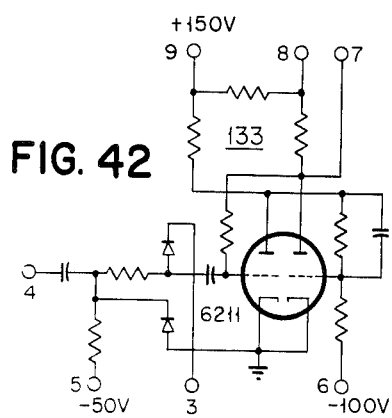
Figure 43:
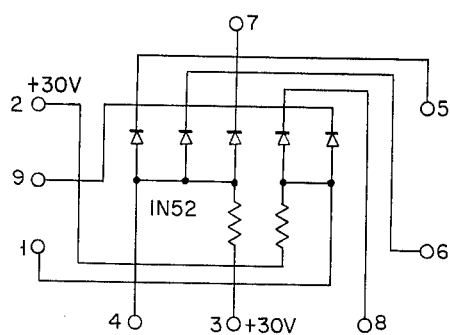

Cathode follower unit 128 of FIG. 41 is a dual device with a common plate connection but individual input and output connections. The output signal level varies from −50 to 0 volts. Delay unit 133 of FIG. 42 receives pulse information, delays it until the following synchronizing pulse occurs, and then shapes it to provide an output pulse at terminal 7. The input pulse presented to input terminal 4 is a negative-going 100-volt pulse. The synchronizing pulses applied to terminal 3 are negative-going (+30 to 0 volts). The circuit constants are selected for optimum performance at a synchronizing pulse repetition rate of 100 kilopulses per second with each of the pulses approximately 2½ microseconds wide. The trailing edge of the input pulse must either coincide with or occur slightly after the trailing edge of the synchronizing pulse. Coincidence diode unit 141 of FIG. 43 contains two positive coincidence diode circuits. One-circuit contains three crystal diodes capable of testing for the coincidences of a maximum of three positive signals or mixing three negative signals. The other circuit contains two crystal diodes and can test for the coincidence of a maximum of two positive signals or provide for mixing two negative signals.

Figure 44:
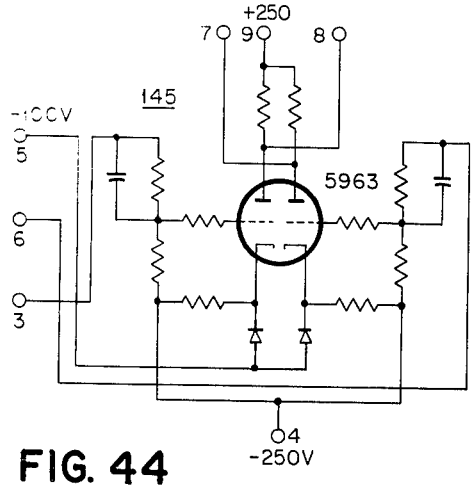
Figure 45:
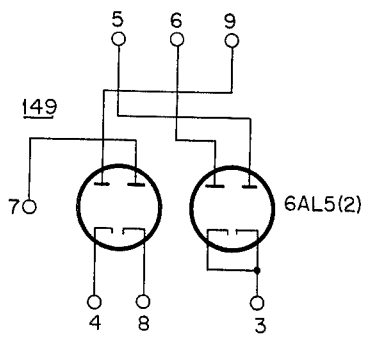

Dual inverter unit 145 of FIG. 44 is capable of operating with a large output swing (more than 300 volts). The plate return is to +250 volts and the cathode return is to −250 volts, with each cathode limited to −100 volts by a diode. The plate swing acts as though the cathode were returned to −250 volts until limiting action occurs. Vacuum diode unit 149 of FIG. 45 contains two twin triode tubes to furnish four diode sections with the cathodes of one tube tied to terminal 3. This unit provides higher impedances in the reverse direction than would a unit employing crystal diodes.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a system for detecting equality between groups of information items, said items comprising numbers expressed in coded notation, the combination of: means for converting said numbers into compressed binary serial form, means for detecting pairs of identical groups of said compressed representations, and means for counting said pairs.

2. In a system for detecting equality between groups of information items, each said group sometimes containing a garble signal and said items comprising numbers expressed in coded notation, the combination of: means for converting said numbers into compressed binary serial form, and means for detecting pairs of identical groups of said compressed representations by the production of an output signal except when both said identical groups contain a garble signal.

3. In a system for detecting equality between groups of information items, said items comprising numbers expressed in coded notation, the combination of: means for converting said numbers into compressed binary serial form, means for forming said compressed representations into a continuous stream of information items, and means for detecting pairs of identical groups of said compressed and continuous representations.

4. In a system for detecting equality between groups of information items, said items comprising numbers expressed in parallel decimal code, the combination of: means for converting said numbers into compressed binary serial form, means for forming said compressed representations into a continuous stream of information items, means for detecting pairs of identical groups of said compressed and continuous representations, and means for counting said pairs and for expressing the resultant count in binary notation.

5. In a system for detecting equality between groups of information items, said items comprising numbers expressed in parallel decimal code, the combination of: means for converting said numbers into compressed binary serial form, said means including means for converting each said number into a binary coded number having plural bit positions for each digit, means for altering the information in certain of said bit positions to indicate the information in a given bit position, and means for eliminating the information in said given bit position to reduce the total bit positions required to represent said number; and means for detecting pairs of identical groups of said compressed representations.

6. In a system for detecting equality between groups of information items, said items comprising numbers expressed in parallel decimal code, the combination of: means for converting said numbers into compressed binary serial form, said means including means for converting each said number into a binary coded number having plural bit positions for each digit, means for altering the information in certain of said bit positions to indicate the information in a given bit position, and means for eliminating the information in said given bit position to reduce the total bit positions required to represent said number; means for detecting pairs of identical groups of said compressed representations; and means for counting said pairs and for expressing the resultant count in binary notation.

7. In a system for detecting equality between groups of information items, said items comprising numbers expressed in parallel decimal code, the combination of: means for converting said numbers into compressed binary serial form; means for detecting pairs of identical groups of said compressed information items, said means comprising delay line means adapted to receive said information item by item and comprising a plurality of separate delay units each adapted to store a single information item, and plural comparison circuit means each responsive to the information item stored in a selected pair of said delay units and adapted to produce an output signal when identical groups of said stored information items occur; and means for combining the outputs of said comparison circuit means in groups to provide combined output signals corresponding to identities detected by all said comparison circuit means.

8. In a system for detecting equality between groups of information items, said items comprising numbers expressed in parallel decimal code, the combination of: means for converting said numbers into compressed binary serial form; means for detecting pairs of identical groups of said compressed information items, said means comprising delay line means adapted to receive said information item by item and comprising a plurality of separate delay units each adapted to store a single information item, plural comparison circuit means each responsive to the information items stored in a selected pair of said delay units and adapted to produce an output signal when identical groups of said stored information items occur, and means for combining the outputs of said comparison circuit means in groups to provide combined output signals corresponding to identities detected by all said comparison circuit means; and means for counting said pairs and for expressing the resultant count in binary notation.

9. In a system for detecting equality between groups of information items, said items comprising numbers expressed in parallel decimal code, the combination of: means for converting said numbers into compressed binary serial form comprising plural groups of information items, each said group sometimes containing a garble signal; means for detecting pairs of identical groups of said compressed representations, said means comprising relay line means adapted to receive said information item by item and comprising a plurality of separate delay units each adapted to store a single information item, plural comparison circuit means each responsive to the information items stored in a selected pair of said delay units and adapted to produce an output signal when identical groups of said stored information items occur, and means responsive to a garble signal in each said group for disabling said plural comparison circuit means whereby no output signal will be produced; and means for combining the outputs of said comparison circuit means in groups to provide combined output signals corresponding to identities recognized by all said comparison circuit means.

10. In a system for detecting equality between groups of information items, said items comprising numbers expressed in parallel decimal code, the combination of: means for converting said numbers into compressed binary serial form comprising plural groups of information items, each said groups sometimes containing a garble signal; means for detecting pairs of identical groups of said compressed representations, said means comprising delay line means adapted to receive said information item by item and comprising a plurality of separate delay units each adapted to store a single information item, plural comparison circuit means each responsive to the information items stored in a selected pair of said delay units and adapted to produce an output signal when identical groups of said stored information items occur, means responsive to a garble signal in each said group for disabling said plural comparison circuit means whereby no output signal will be produced, and means for combining the outputs of said comparison circuit means in groups to provide combined output signals corresponding to identities recognized by all said comparison circuit means; and means for counting said identities and for expressing the resultant count in binary notation.

11. In a system for detecting equality between groups of information items, said items comprising numbers expressed in parallel decimal code and said groups being of selectable lengths, the combination of: means for converting said numbers into compressed binary serial form; means for detecting pairs of identical groups of said compressed representations, said means comprising delay line means adapted to receive said information item by item and comprising a plurality of separate delay units each adapted to store a single information item, plural comparison circuit means each responsive to the information items supplied to first and second input terminals thereof and adapted to produce an output signal when identical groups of said supplied information items occur, means for connecting each said first input terminal to a predetermined one of said delay units, and switching means for selectably connecting each said second input terminal to one of a predetermined pair of said delay units; and means for combining the outputs of said comparison circuit means in groups to provide combined output signals corresponding to identities recognized by all said comparison circuit means.

12. In a system for detecting equality between groups of information items, said items comprising numbers expressed in parallel decimal code and said groups being of selectable lengths, the combination of: means for converting said numbers tinto compressed binary serial form; means for detecting pairs of identical groups of said compressed representations, said means comprising delay line means adapted to receive said information item by item and comprising a plurality of separate delay units each adapted to store a single information item, plural comparison circuit means each responsive to the information items supplied to first and second input terminals thereof and adapted to produce an output signal when identical groups of said supplied information items occur, means for connecting each said first input terminal to a predetermined one of said delay units, switching means for selectably connecting each said second input terminal to one of a predetermined pair of said delay units, and means for combining the outputs of said comparison circuit means in groups to provide combined output signals corresponding to identities recognized by all said comparison circuit means; and means for counting said identities and for expressing the resultant count in binary notation.

13. In a system for converting numbers expressed in parallel decimal code into compressed binary serial form, the combination of: means for converting a parallel decimal coded multi-digit number into a binary coded number having plural bit positions for each said digit, means for altering the information in certain of said bit positions to indicate the information in a given bit position, means for eliminating the information in said given bit position to reduce the total bit positions required to represent said number, and means for converting said compressed representation into serial form.

14. Apparatus for recognizing pairs of identical groups of information items, comprising: delay line means adapted to receive said information item by item and comprising a plurality of separate delay units each adapted to store a single information item, plural comparison circuit means each responsive to the information items stored in a selected pair of said delay units and adapted to produce an output signal when identical groups of said stored information items occur, and means for combining the outputs of said comparison circuit means in groups to provide combined output signals corresponding to identities recognized by all said comparison circuit means.

15. Apparatus for recognizing pairs of identical groups of information items, each said group sometimes containing a garble signal, comprising: delay line means adapted to receive said information item by item and comprising a plurality of separate delay units each adapted to store a single information item, plural comparison circuit means each responsive to the information items stored in a selected pair of said delay units and adapted to produce an output signal when identical groups of said stored information items occur, means responsive to a garble signal in each said group for disabling said plural comparison circuit means whereby no output signal will be produced, and means for combining the outputs of said comparison circuit means in groups to provide combined output signals corresponding to identities recognized by all said comparison circuit means.

16. Apparatus for recognizing pairs of identical groups of information items, said groups being of selectable length, comprising: delay line means adapted to receive said information item by item and comprising a plurality of separate delay units each adapted to store a single information item, plural comparison circuit means each responsive to the information items supplied to first and second input terminals thereof and adapted to produce an output signal when identical groups of said supplied information items occur, means for connecting each said first input terminal to a predetermined one of said delay units, switching means for selectably connecting each said second input terminal to one of a predetermined pair of said delay units, and means for combining the outputs of said comparison circuit means in groups to provide combined output signals corresponding to identities recognized by all said comparison circuit means.

References Cited by the Examiner

UNITED STATES PATENTS

| | | | |
|---|---|---|---|
| 2,615,127 | 10/1952 | Edwards | 340—149 |
| 2,628,346 | 2/1953 | Burkhart | 235—61 |
| 2,648,829 | 8/1953 | Ayres | 340—149 |
| 2,708,748 | 5/1955 | Straube | 235—61 |
| 2,737,342 | 3/1956 | Nelson | 235—61 |
| 2,762,564 | 9/1956 | Samson et al. | 340—347 |
| 2,763,854 | 9/1956 | Oliwa | 235—61 |
| 2,844,309 | 7/1958 | Ayres | 340—149 |
| 2,846,671 | 8/1958 | Yetter | 340—347 |

MALCOLM A. MORRISON, *Primary Examiner.*

NORMAN H. EVANS, FREDERICK M. STRADER, CHESTER L. JUSTUS, *Examiners.*